(12) United States Patent
Sasai et al.

(10) Patent No.: US 11,781,254 B2
(45) Date of Patent: Oct. 10, 2023

(54) PRODUCTION METHOD FOR LOW MOLECULAR WEIGHT POLYMER, AND PRODUCTION DEVICE AND PRODUCTION METHOD FOR MELT-BLOWN NON-WOVEN FABRIC

(71) Applicants: Shibaura Machine Co., Ltd., Tokyo (JP); NATIONAL UNIVERSITY CORPORATION KANAZAWA UNIVERSITY, Ishikawa (JP)

(72) Inventors: Yuya Sasai, Tokyo (JP); Takafumi Sameshima, Tokyo (JP); Yoshio Iizuka, Tokyo (JP); Kaho Osada, Tokyo (JP); Kentaro Taki, Ishikawa (JP)

(73) Assignees: SHIBAURA MACHINE CO., LTD., Tokyo (JP); National University Corporation Kanazawa University, Ishikawa (JP)

( * ) Notice: Subject to any disclaimer, the term of this patent is extended or adjusted under 35 U.S.C. 154(b) by 134 days.

(21) Appl. No.: 17/311,685

(22) PCT Filed: Dec. 21, 2020

(86) PCT No.: PCT/JP2020/047729
§ 371 (c)(1),
(2) Date: Jun. 7, 2021

(87) PCT Pub. No.: WO2021/132175
PCT Pub. Date: Jul. 1, 2021

(65) Prior Publication Data
US 2022/0325455 A1     Oct. 13, 2022

(30) Foreign Application Priority Data

Dec. 27, 2019   (JP) .................................. 2019-238163

(51) Int. Cl.
*D04H 1/56* (2006.01)
*B29C 48/88* (2019.01)
(Continued)

(52) U.S. Cl.
CPC ................ *D04H 1/565* (2013.01); *B29B 7/48* (2013.01); *B29B 7/726* (2013.01); *B29B 7/728* (2013.01);
(Continued)

(58) Field of Classification Search
CPC ........... B29B 7/48; B29B 7/726; B29B 7/728; B29B 7/82; B29B 7/42; B29B 7/426;
(Continued)

(56) References Cited

FOREIGN PATENT DOCUMENTS

| CN | 108754644 | 11/2018 | | |
|---|---|---|---|---|
| CN | 108754644 A | * 11/2018 | ............. | D01D 11/02 |

(Continued)

OTHER PUBLICATIONS

"Office Action of Korea Counterpart Application" with English translation thereof, dated Jan. 27, 2022, p. 1-p. 8.
(Continued)

*Primary Examiner* — Lynda Salvatore
(74) *Attorney, Agent, or Firm* — JCIPRNET

(57) ABSTRACT

A production method for a low molecular weight polymer suitable for a melt-blown non-woven fabric and a production device for melt-blown non-woven fabric, with which a high molecular weight polymer can be reduced in molecular weight by applying a shear force to the high molecular weight polymer without adding an additive. The low molecular weight polymer and the melt-blown non-woven fabric are produced using a continuous high shearing device that applies a shear force to the high molecular weight polymer serving as a raw material by rotation of a screw body to reduce the molecular weight of the high molecular
(Continued)

weight polymer so as to obtain a low molecular weight polymer, and cools the low molecular weight polymer by passing the low molecular weight polymer through a passage arranged in the axial direction inside the screw body.

9 Claims, 18 Drawing Sheets

(51) Int. Cl.
| | |
|---|---|
| *B29C 48/86* | (2019.01) |
| *B29C 48/30* | (2019.01) |
| *B29C 48/05* | (2019.01) |
| *B29C 48/285* | (2019.01) |
| *B29B 7/48* | (2006.01) |
| *B29B 7/72* | (2006.01) |
| *B29B 7/82* | (2006.01) |
| *D04H 1/4291* | (2012.01) |

(52) U.S. Cl.
CPC ............... *B29B 7/82* (2013.01); *B29C 48/05* (2019.02); *B29C 48/298* (2019.02); *B29C 48/30* (2019.02); *B29C 48/865* (2019.02); *B29C 48/88* (2019.02); *D04H 1/4291* (2013.01); *B29C 2793/0081* (2013.01); *B29C 2948/922* (2019.02); *B29C 2948/92209* (2019.02)

(58) Field of Classification Search
CPC .......... B29B 7/483; B29B 7/487; B29B 7/72; B29B 7/845; B29B 13/00; B29C 2793/0081; B29C 2948/922; B29C 2948/92209; B29C 48/05; B29C 48/298; B29C 48/30; B29C 48/865; B29C 48/88; B29C 2948/92695; B29C 2948/92704; B29C 48/285; B29C 48/345; B29C 48/385; B29C 48/395; B29C 48/397; B29C 48/40; B29C 48/402; B29C 48/51; B29C 48/55; B29C 48/57; B29C 48/767; B29C 48/78; B29C 48/86; B29C 48/00; B29C 48/14; B29C 48/92; D04H 1/4291; D04H 1/565; D04H 3/16; D04H 1/56; D04H 3/007; D04H 1/54; C08F 10/06; C08F 8/50; C08L 23/12; D01F 6/06
See application file for complete search history.

(56) References Cited

FOREIGN PATENT DOCUMENTS

| | | |
|---|---|---|
| JP | 2010516858 | 5/2010 |
| JP | 2011235609 | 11/2011 |
| JP | 2015214143 | 12/2015 |
| JP | 2016203576 | 12/2016 |
| JP | 2019199506 | 11/2019 |
| KR | 20020079816 | 10/2002 |
| KR | 20150095835 | 8/2015 |
| KR | 20160105873 | 9/2016 |

OTHER PUBLICATIONS

P.D. Iedema et al., "Controlled peroxide-induced degradation of polypropylene in a twin-screw extruder: Change of molecular weight distribution under conditions controlled by micromixing", Chemical Engineering Science vol. 66, Issue 22, Nov. 15, 2011, pp. 5474-5486.

"International Search Report (Form PCT/ISA/210) of PCT/2020/047729", dated Feb. 9, 2021, pp. 1-3.

Office Action of China Counterpart Application, with English translation thereof, dated Sep. 15, 2022, pp. 1-10.

"Office Action of Korea Counterpart Application", with English translation thereof, dated Sep. 23, 2021, p. 1-p. 15.

"Office Action of Taiwan Counterpart Application", with English translation thereof, dated Sep. 6, 2021, p. 1-p. 13.

* cited by examiner (a)

(b)

PRODUCTION METHOD FOR LOW MOLECULAR WEIGHT POLYMER, AND PRODUCTION DEVICE AND PRODUCTION METHOD FOR MELT-BLOWN NON-WOVEN FABRIC

CROSS-REFERENCE TO RELATED APPLICATION

This application is a 371 application of the international PCT application serial no. PCT/2020/047729, filed on Dec. 21, 2020, which claims the priority benefit of Japan application no. 2019-238163, filed on Dec. 27, 2019. The entirety of each of the above-mentioned patent applications is hereby incorporated by reference herein and made a part of this specification.

BACKGROUND

Technical Field

The present invention relates to a production method for low molecular weight polymer in which a high molecular weight polymer is reduced in molecular weight to obtain a low molecular weight polymer, and relates to a production device and a production method for melt-blown non-woven fabric which can continuously perform molecular weight reduction of a general-purpose polymer and formation of a melt-blown non-woven fabric.

Related Art

Thermoplastic resins such as polypropylene resin and nylon 6 are used after being adjusted to a viscosity suitable for various uses. For example, when the thermoplastic resins are used for fine fibers, non-woven fabrics, filter media, and the like, the viscosity needs to be suitable for a melt-blown production method. Therefore, in order to produce a low molecular weight polymer having a low viscosity (hereinafter, appropriately referred to as a low molecular weight polymer), the addition amount of metallocene catalyst or the like used in polymerization methods described in Patent literatures 1 and 2 and the polymerization time are adjusted.

However, the adjustment of molecular weight according to the polymerization conditions leads to an increase in production cost of the low molecular weight polymer. Therefore, if the low molecular weight polymer can be produced by reducing the molecular weight of the high molecular weight polymer, it is economical and industrially useful. For example, Non-patent literature 1 describes that a peroxide is used for polypropylene and a twin-screw kneading extrusion device is used to reduce the molecular weight.

LITERATURE OF RELATED ART

Patent Literature

Patent literature 1: Japan National Publication of International Patent Application No. 2010-516858
Patent literature 2: Japanese Patent Laid-open No. 2019-199506

Non-Patent Literature

Non-patent literature 1: "Controlled peroxide-induced degradation of polypropylene in a twin-screw extruder: Change of molecular weight distribution under conditions controlled by micromixing" P. D. Iedema et al (Chemical Engineering Science 66 (2011) 5474-5486)

SUMMARY

Problems to be Solved

However, as in the method described in Non-patent literature 1, there is a problem that when a peroxide is used, the deterioration progresses only in the vicinity of the peroxide, so that spatial non-uniformity occurs in the molecular weight and the dispersion of the molecular weight becomes large. If the molecular weight distribution (polydispersity) of the obtained polymer is large, when the polymer is used as, for example, a raw material for a non-woven fabric produced by the melt-blown production method, the fibers are easily cut during the production of web-like fibers. In addition, the conventional method using a twin-screw kneading extruder has a problem that the molecular weight is reduced continuously for a long time under high temperature conditions, and thus the polymer undergoes a large degree of thermal deterioration when the molecular weight is reduced.

The present invention provides a production method for low molecular weight polymer, with which a high molecular weight polymer can be reduced in molecular weight in a short time by applying a shear force to the high molecular weight polymer without adding an additive such as a peroxide that promotes thermal decomposition reaction, and the low molecular weight polymer can be efficiently produced.

Means to Solve Problems

A production method for low molecular weight polymer of the present invention is a production method for low molecular weight polymer using an extruder, in which a shear force is applied to a high molecular weight polymer serving as a raw material by rotation of a screw body to reduce the molecular weight so as to obtain a low molecular weight polymer, and the low molecular weight polymer is cooled by passing through a passage arranged in the axial direction inside the screw body.

A production device for melt-blown non-woven fabric of the present invention includes a die for extruding a polymer, a supply part that supplies the polymer to the die, and a hot air supply part that supplies hot air to the polymer extruded from the die and stretches the polymer in a fibrous form. The supply part is a continuous high shearing device that applies a shear force to a high molecular weight polymer serving as a raw material by rotation of a screw to reduce the molecular weight so as to obtain a low molecular weight polymer, and the supply part includes a barrier portion for forming a raw material reservoir and a passage arranged across the barrier portion in the axial direction inside the screw.

In a production method for melt-blown non-woven fabric of the present invention, a shear force is applied to a high molecular weight polymer that does not contain a molecular weight reducing agent to obtain a low molecular weight polymer that has been reduced in molecular weight, and hot air is supplied to the low molecular weight polymer extruded from a die and the low molecular weight polymer is stretched in a fibrous form to obtain a non-woven fabric.

Effect

Compared with a method of adjusting polymerization conditions to polymerize a low molecular weight polymer, the production method for low molecular weight polymer of the present invention can efficiently produce a low molecular weight polymer in a large amount and at low cost by reducing the molecular weight of a high molecular weight polymer. In addition, by applying a shear force to the high molecular weight polymer and passing the low molecular weight polymer through an internal passage to cool the low molecular weight polymer, heat generation due to the shear force can be suppressed, and a low molecular weight polymer with suppressed thermal deterioration can be obtained.

The production device for melt-blown non-woven fabric of the present invention includes, as a supply part that supplies the polymer to a die, a continuous high shearing device which applies a shear force to a high molecular weight polymer serving as a raw material by rotation of a screw to reduce the molecular weight. Therefore, it is possible to continuously perform molecular weight reduction of a general-purpose polymer and formation of a melt-blown non-woven fabric. In addition, because no molecular weight reducing agent such as a peroxide is used when the general-purpose polymer is reduced in molecular weight, a melt-blown non-woven fabric suitable for medical and sanitary purposes can be produced which has no problem of yellowing or odor caused by decomposition products of additives. Furthermore, by using the continuous high shearing device to supply the polymer serving as a raw material to the die that produces the non-woven fabric, a single inexpensive general-purpose polymer (general-purpose resin) that is widely available can be separately made into low molecular weight polymers having a molecular weight suitable for various uses, and high-mix low-volume production can be realized by a single raw material and a single device.

Figure 16:
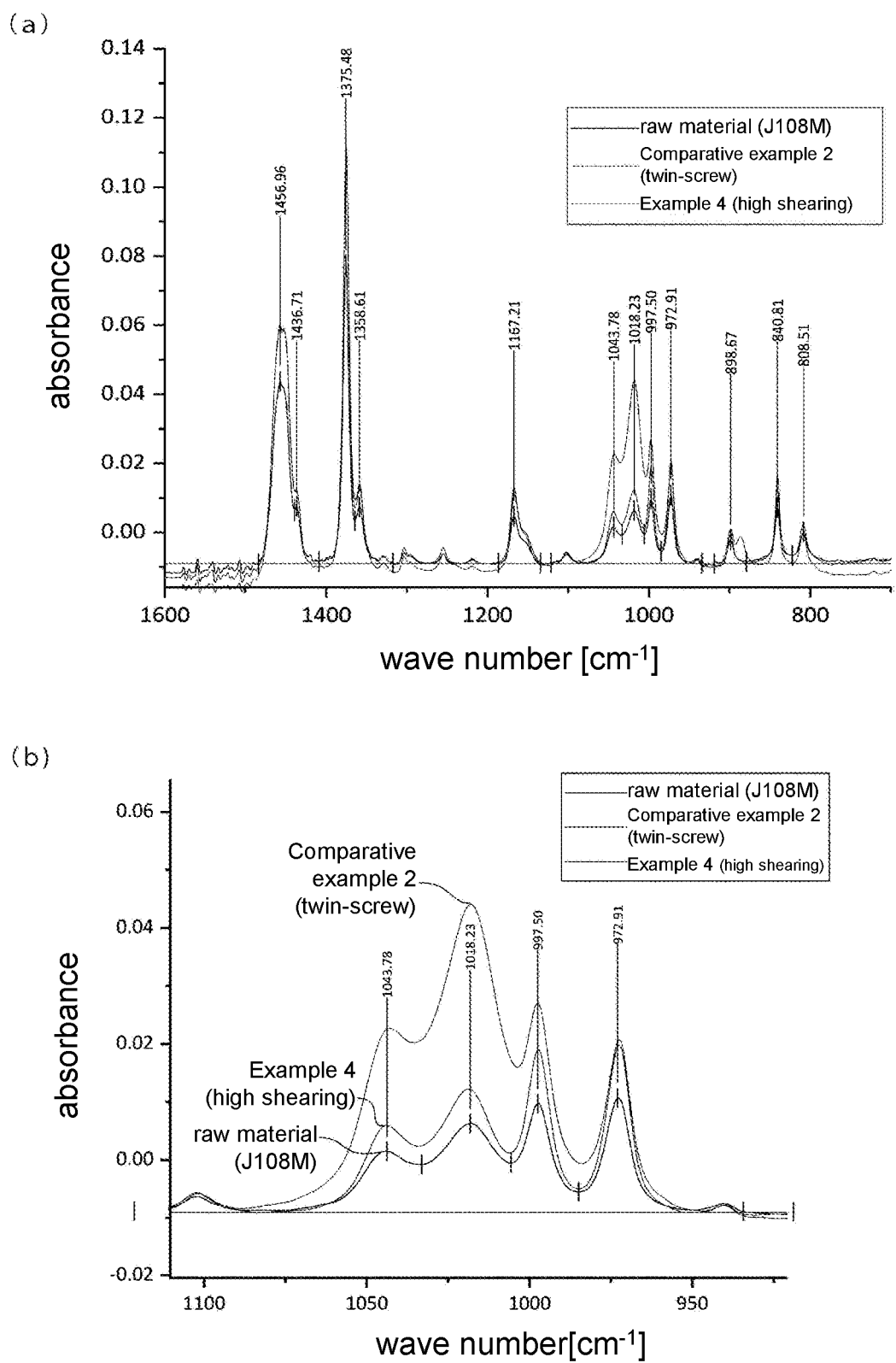

(a) of FIG. 16 is a graph showing the measurement results of FT-IR, and (b) of FIG. 16 is an enlarged graph showing the vicinity of a peak attributed to C—O expansion and contraction.

Figure 17:
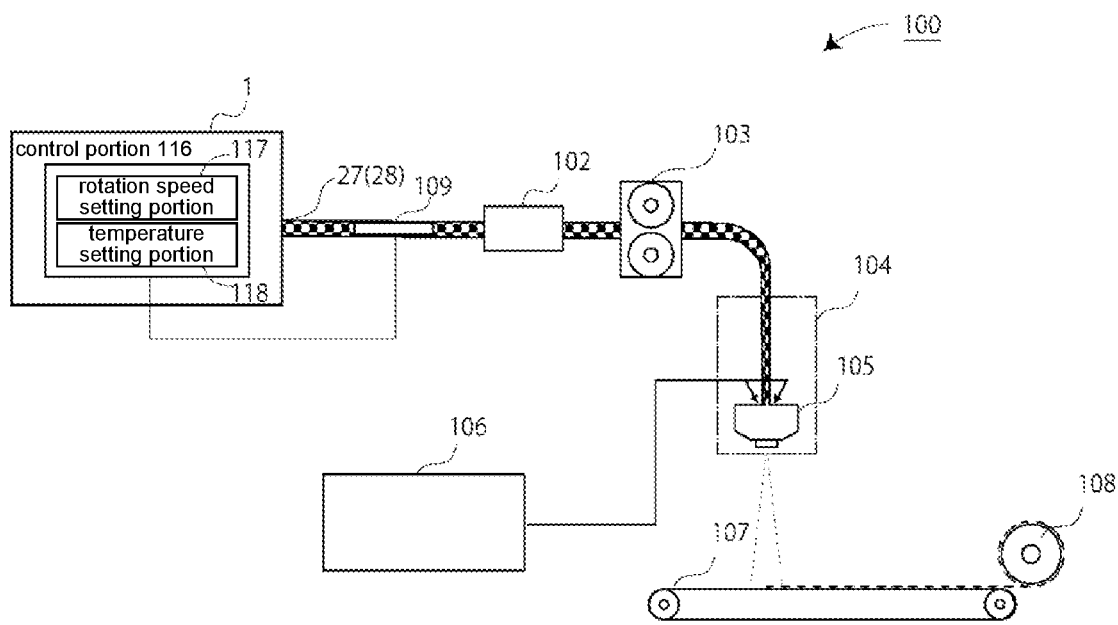

FIG. 17 is a schematic diagram showing the outline of the configuration of a production device according to an embodiment of the present invention.

Figure 18:
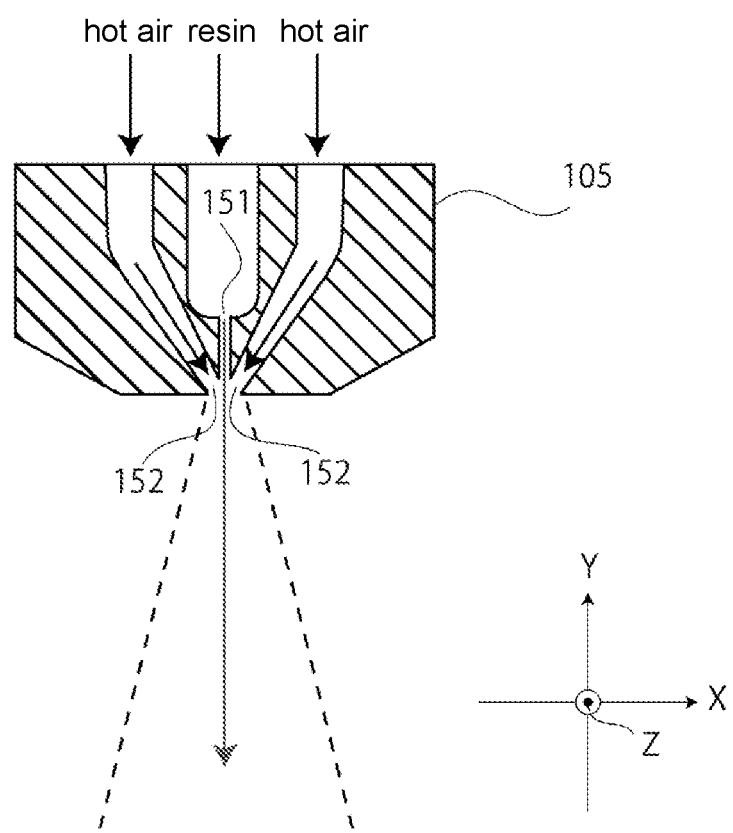

FIG. 18 is a partial cross-sectional view of a nozzle head in the production device of FIG. 17.

Figure 19:
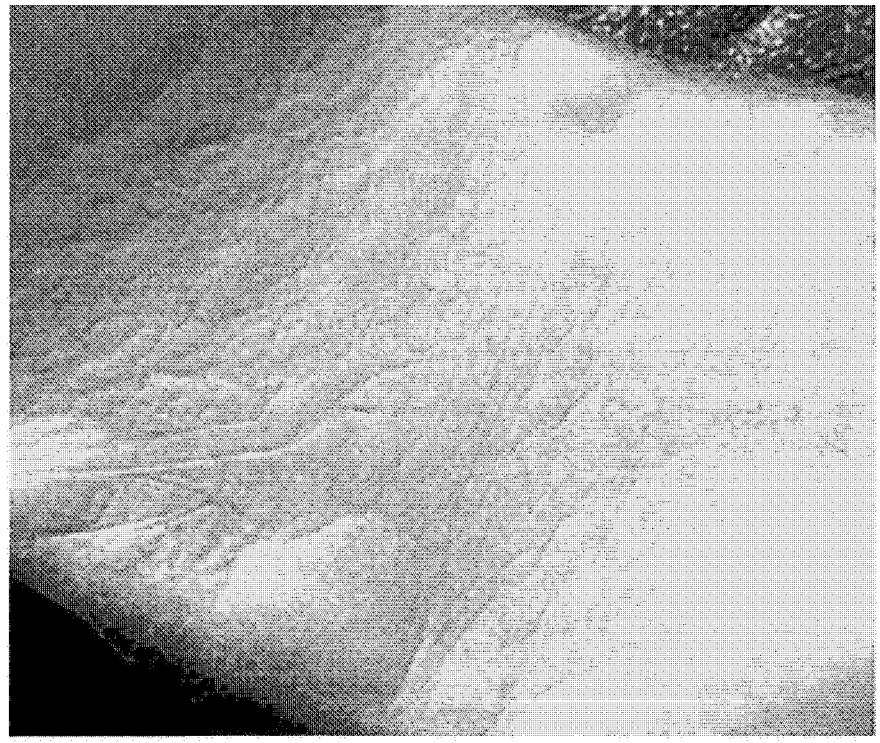
Figure 19:
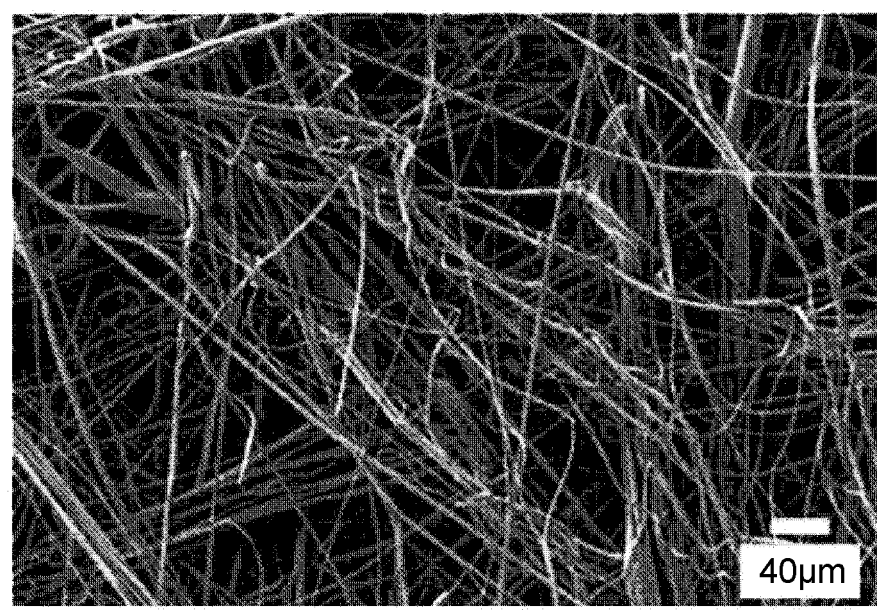

(a) of FIG. 19 is a drawing-substituting photograph showing the appearance of a melt-blown non-woven fabric of Example 8, and (b) of FIG. 19 is an electron microscope image of the melt-blown non-woven fabric of Example 8.

DESCRIPTION OF THE EMBODIMENTS

Production Method for Low Molecular Weight Polymer

In a production method for low molecular weight polymer of the present invention, a shear force is applied to a high molecular weight polymer serving as a raw material to reduce the molecular weight, and the low molecular weight polymer is cooled by passing through a passage arranged inside a screw body. By applying a shear force and cooling by passing through a passage, thermal deterioration in molecular weight reduction can be suppressed. In addition, by reducing the molecular weight without adding a peroxide, a low molecular weight polymer having a small degree of polydispersity (weight average molecular weight/number average molecular weight) can be obtained. By intermittently applying a shear force while passing through a passage for cooling, thermal deterioration in a low molecular weight polymer obtained by molecular weight reduction of a high molecular weight polymer can be suppressed.

The thermal deterioration in a low molecular weight polymer can be evaluated by the degree to which a C—O bond is formed by molecular weight reduction. The degree to which a C—O bond is formed can be evaluated using, for example, the intensity of a peak attributed to C—O expansion and contraction obtained by measuring FT-IR. According to the production method of the present invention, a low molecular weight polymer with low thermal deterioration can be produced, in which the intensity of the peak generated in a wave number of 1000 to 1030 $cm^{-1}$ attributed to the C—O expansion and contraction is suppressed to less than or equal to 3 times that of the high molecular weight polymer used as a raw material.

High Molecular Weight Polymer

The present invention uses a high molecular weight polymer as a raw material. In the present invention, the "high molecular weight polymer" refers to a polymer having a weight average molecular weight (Mw) of 200,000 or more. Examples of the high molecular weight polymer include thermoplastic resins such as polypropylene (PP), polysulfone (PS), polyethylene terephthalate (PET), polybutylene terephthalate (PBT), polyethersulfone (PES), polyphenylene sulfide (PPS), polyetherketone (PEK), polyether ether ketone (PEEK), aromatic polyamide (PA), aromatic polyester, aromatic polycarbonate (PC), polyetherimide (PEI), polyarylene oxide, thermoplastic polyimide, polyamide imide, and the like. One type of these resins may be used, or two or more types may be used in combination.

The high molecular weight polymer preferable as the raw material of a low molecular weight polymer for non-woven fabric production using a melt-blown production method may be polypropylene. From the viewpoint of producing a low molecular weight polymer having a melt flow rate (appropriately referred to as "MFR"; JIS K7210-1 (B method), weight 2.16 kg, temperature 230° C.) suitable for non-woven fabric production by molecular weight reduction, the weight average molecular weight (Mw) of the polypropylene is preferably 250,000 to 1,100,000, more preferably 250,000 to 500,000, and further preferably 250,000 to 400,000.

Low Molecular Weight Polymer

By reducing the molecular weight of the high molecular weight polymer with the production method of the present invention, it is possible to produce a low molecular weight polymer having properties suitable for various uses. In the present invention, the "low molecular weight polymer" refers to a polymer having a weight average molecular weight (Mw) of less than 200,000. When a low molecular weight polymer is used as the raw material for the melt-blown production method, the MFR of the low molecular weight polymer is preferably 500 to 2000 (g/10 min), and more preferably 1000 to 2000 (g/10 min).

By the production method of the present invention for reducing the molecular weight of a high molecular weight polymer, a low molecular weight polymer having a small molecular weight distribution can be obtained. The low molecular weight polymer having a small molecular weight distribution is less likely to break when yarn is produced by the melt-blown production method. From the viewpoint of efficiently producing a non-woven fabric by the melt-blown production method, the polydispersity (Mw/Mn) of the low molecular weight polymer is preferably 2 to 5, more preferably 2 to 4, and further preferably 2 to 3.5.

The above-described low molecular weight polymer of the present invention can be produced in a manner that a continuous high shearing device (extruder, hereinafter appropriately referred to as high shearing device) is used which melt-kneads a raw material including a high molecular weight polymer and continuously discharges the raw material, and when the raw material is transported along the outer peripheral surface of a screw body including a passage inside, the transport of the raw material is restricted by a barrier portion arranged on the outer peripheral surface, a shear force is applied to the raw material by the screw body, and the raw material is cooled by passing from an inlet of a passage arranged on the outer peripheral surface to an outlet of the passage.

By using the high shearing device, a large shear force can be applied to the high molecular weight polymer without adding an additive such as a peroxide that promotes thermal decomposition reaction, and the high molecular weight polymer can be reduced in molecular weight. From the viewpoint of suppressing thermal deterioration in molecular weight reduction, it is preferable that the time required for molecular weight reduction is short. For example, the total time is preferably 30 seconds or less, and more preferably 20 seconds or less. When the molecular weight reduction is repeated, the time for each molecular weight reduction divided by passing through the passage is preferably 15 seconds or less, and more preferably 10 seconds or less.

As described above, by shortening the time for reducing the molecular weight, the thermal deterioration in low molecular weight polymer can be suppressed. Therefore, even if a barrel set temperature is set at 250° C. to 350° C., the thermal deterioration during the molecular weight reduction can be suppressed.

The production method of the present invention is described below with reference to the high shearing device.

Figure 1:
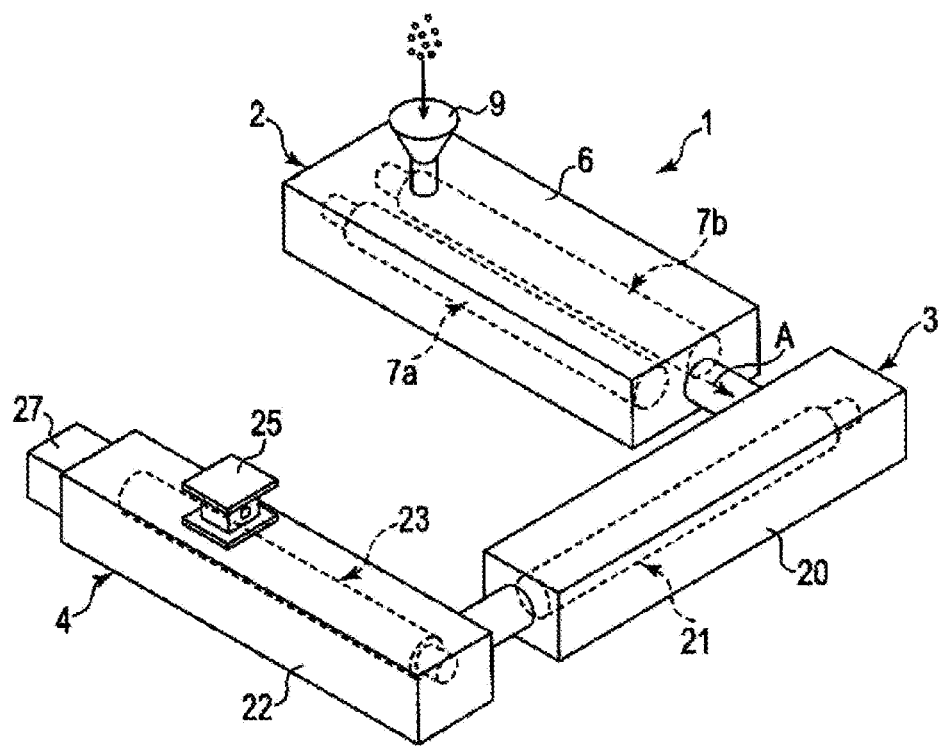
FIG. 1 is a perspective view roughly showing a device used in a production method of the present invention.

FIG. 1 roughly shows the configuration of a high shearing device 1. The high shearing device 1 shown in FIG. 1 includes a first extruder (processing machine) 2 and a third extruder (defoamer) 4 in addition to a second extruder 3 for reducing the molecular weight of a high molecular weight polymer. The first extruder 2, the second extruder 3 and the third extruder 4 are connected in series with each other.

The first extruder 2 is a processing machine for preliminarily kneading and melting raw materials including the high molecular weight polymer. These raw materials are supplied to the first extruder 2 in the form of, for example, pellets or powder.

Figure 2:
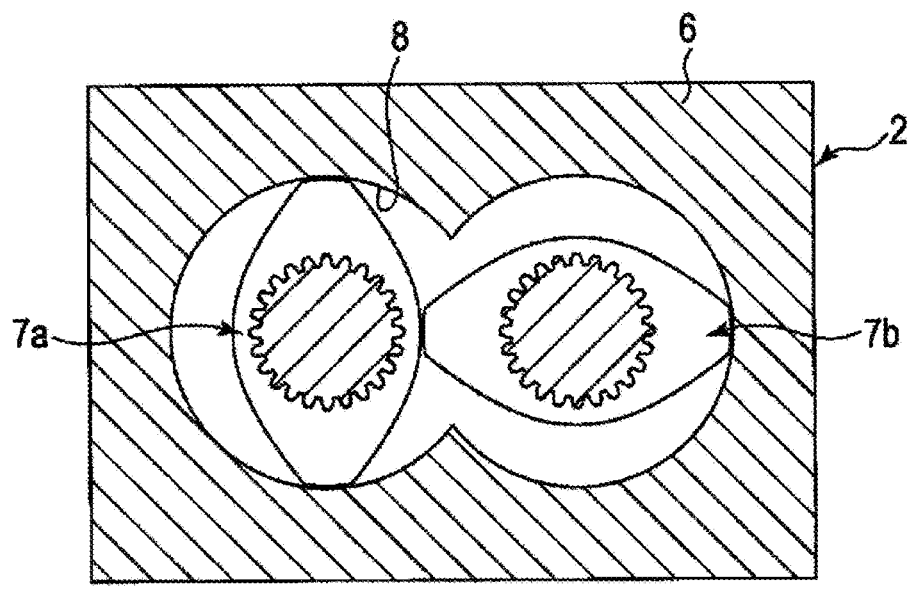
FIG. 2 is a cross-sectional view of a first extruder shown in FIG. 1.
Figure 3:
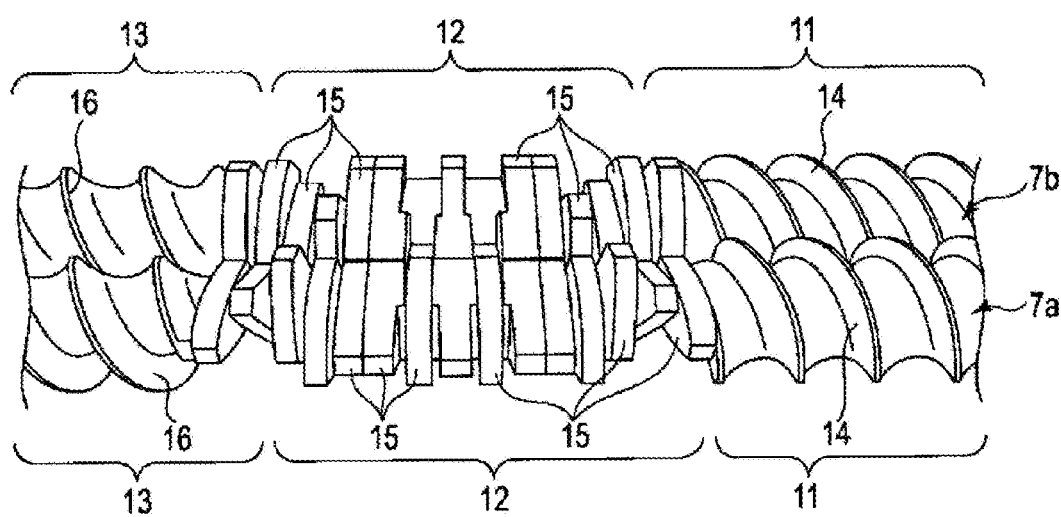
FIG. 3 is a perspective view showing a state in which two screws of the first extruder shown in FIG. 1 are meshed with each other.

In the embodiment, in order to strengthen the degree of kneading and melting of the raw materials, a twin-screw kneader of a codirectional rotation type is used as the first extruder 2. FIGS. 2 and 3 disclose an example of the twin-screw kneader. The twin-screw kneader includes a barrel 6 and two screws 7a and 7b accommodated inside the barrel 6. The barrel 6 includes a cylinder portion 8 having a shape in which two cylinders are combined. The high molecular weight polymer serving as a raw material is continuously supplied to the cylinder portion 8 from a supply port 9 arranged at one end of the barrel 6. Furthermore, the barrel 6 has a built-in heater for melting the raw materials.

The screws 7a and 7b are accommodated in the cylinder portion 8 in a state of being meshed with each other. The screws 7a and 7b receive a torque transmitted from a motor (not shown) and are rotated in the same direction. As shown in FIG. 3, the screws 7a and 7b each include a feed portion 11, a kneading portion 12, and a pumping portion 13. The feed portion 11, the kneading portion 12, and the pumping portion 13 are arranged in a row along the axial direction of the screws 7a and 7b.

The feed portion 11 has a flight 14 that is spirally twisted. The flights 14 of the screws 7a and 7b rotate in a state of being meshed with each other, and transport the raw materials including the high molecular weight polymer supplied from the supply port 9 toward the kneading portion 12.

The kneading portion 12 has a plurality of discs 15 arranged in the axial direction of the screws 7a and 7b. The discs 15 of the screws 7a and 7b rotate in a state of facing each other, and preliminarily knead the high molecular weight polymer which is a raw material sent from the feed portion 11. The kneaded raw material is sent to the pumping portions 13 by the rotation of the screws 7a and 7b.

The pumping portion 13 has a flight 16 that is spirally twisted. The flights 16 of the screws 7a and 7b rotate in a state of being meshed with each other, and push out the preliminarily kneaded raw material from a discharge end of the barrel 6.

According to this twin-screw kneader, the raw material supplied to the feed portions 11 of the screws 7a and 7b is melted by receiving the shear heat generated along the rotation of the screws 7a and 7b and the heat of the heater. The raw material melted by the preliminary kneading in the twin-screw kneader is continuously supplied to the second extruder 3 from the discharge end of the barrel 6 as shown by an arrow A in FIG. 1.

Furthermore, by configuring the first extruder 2 as a twin-screw kneader, at the time when the raw material is supplied to the second extruder 3, the raw material is melted by the preliminary kneading in the first extruder 2 and kept at the optimum viscosity. In addition, by configuring the first extruder 2 as a twin-screw kneader, when the raw material is continuously supplied to the second extruder 3, a predetermined amount of the raw material can be stably supplied per unit time. Therefore, the burden on the second extruder 3 for reducing the molecular weight of the high molecular weight polymer serving as a raw material can be reduced. Moreover, in the first extruder 2, a shear force is applied to the raw material for the purpose of smooth melting, not for the purpose of molecular weight reduction.

The second extruder 3 is an element for reducing the molecular weight of the high molecular weight polymer serving as a raw material to produce a low molecular weight polymer. In the embodiment, a high shearing device which is a single-screw extruder is used as the second extruder 3. The single-screw extruder includes a barrel 20 and a single screw 21. The screw 21 has a function of imparting a shearing action and a cooling action to the melted raw material. The configuration of the second extruder 3 including the screw 21 is described later in detail.

Figure 4:
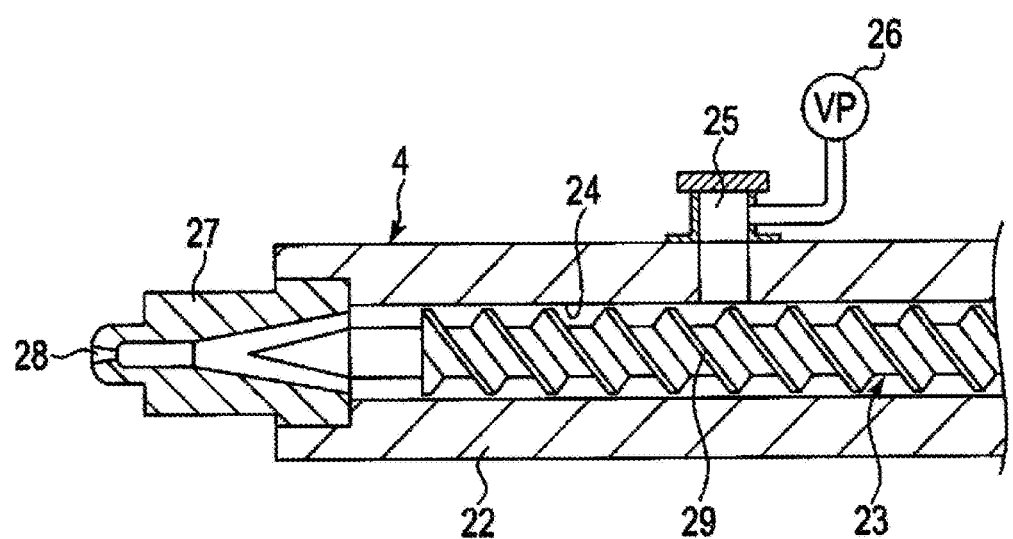
FIG. 4 is a cross-sectional view of a third extruder shown in FIG. 1.

The third extruder 4 is an element for sucking and removing gas component contained in the low molecular weight polymer discharged from the second extruder 3. In the embodiment, a single-screw extruder is used as the third extruder 4. As shown in FIG. 4, the single-screw extruder includes a barrel 22 and a single vent screw 23 accommodated in the barrel 22. The barrel 22 includes a cylinder portion 24 having a straight cylindrical shape. Kneaded product extruded from the second extruder 3 is continuously supplied to the cylinder portion 24 from one end of the cylinder portion 24 along the axial direction.

The barrel 22 has a vent port 25. The vent port 25 is opened in an intermediate portion of the cylinder portion 24 along the axial direction and is connected to a vacuum pump 26. Furthermore, the other end of the cylinder portion 24 of the barrel 22 is closed by a head portion 27. The head portion 27 has a discharge port 28 for discharging the low molecular weight polymer.

The vent screw 23 is accommodated in the cylinder portion 24. The vent screw 23 is rotated in one direction by receiving a torque transmitted from a motor (not shown). The vent screw 23 has a flight 29 that is spirally twisted. The flight 29 rotates integrally with the vent screw 23 and continuously transports the kneaded product supplied to the cylinder portion 24 toward the head portion 27. The kneaded product receives a vacuum pressure of the vacuum pump 26 when transported to a position corresponding to the vent port 25. That is, by drawing the inside of the cylinder portion 24 to a negative pressure by a vacuum pump, gaseous substances and other volatile components contained in the kneaded product are continuously sucked and removed from the kneaded product. The kneaded product from which the gaseous substances and other volatile components have been removed is continuously discharged as a low molecular weight polymer from the discharge port 28 of the head portion 27 to the outside of the high shearing device 1.

Next, the second extruder 3, which is an element for producing a low molecular weight polymer, is described.

Figure 5:
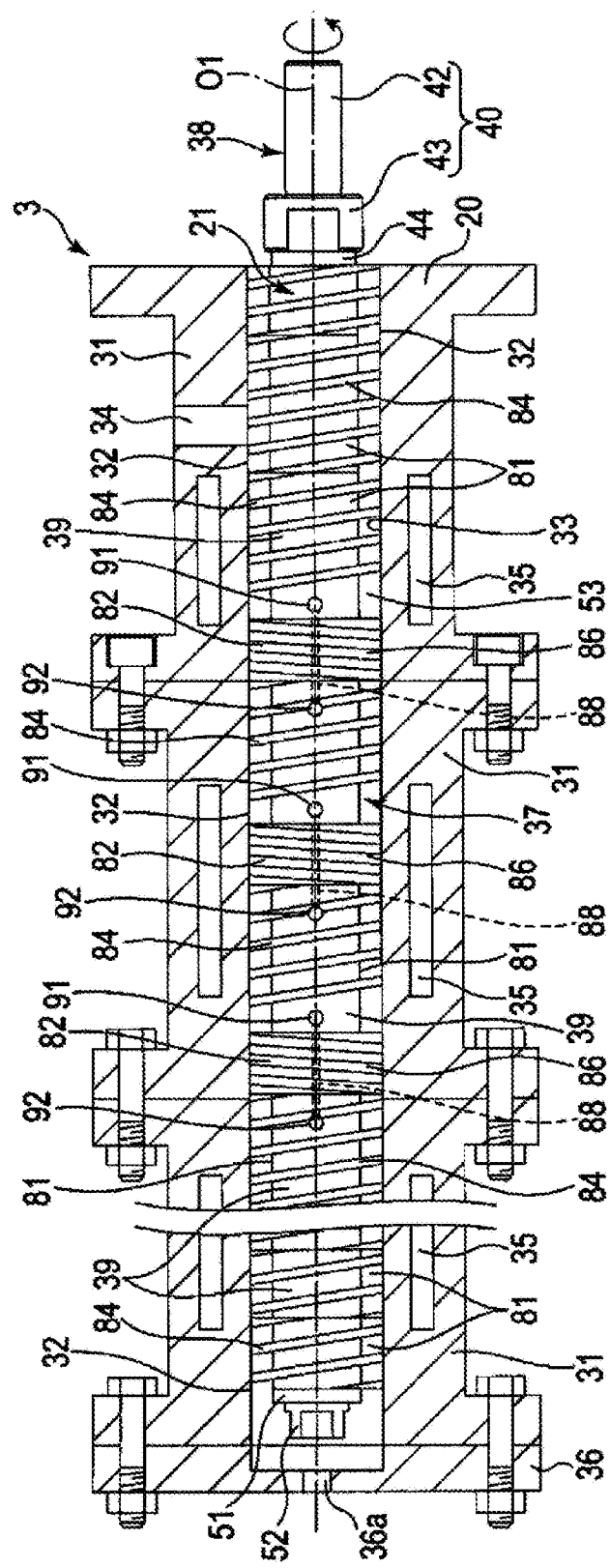
FIG. 5 is a cross-sectional view of a second extruder shown in FIG. 1.
Figure 6:
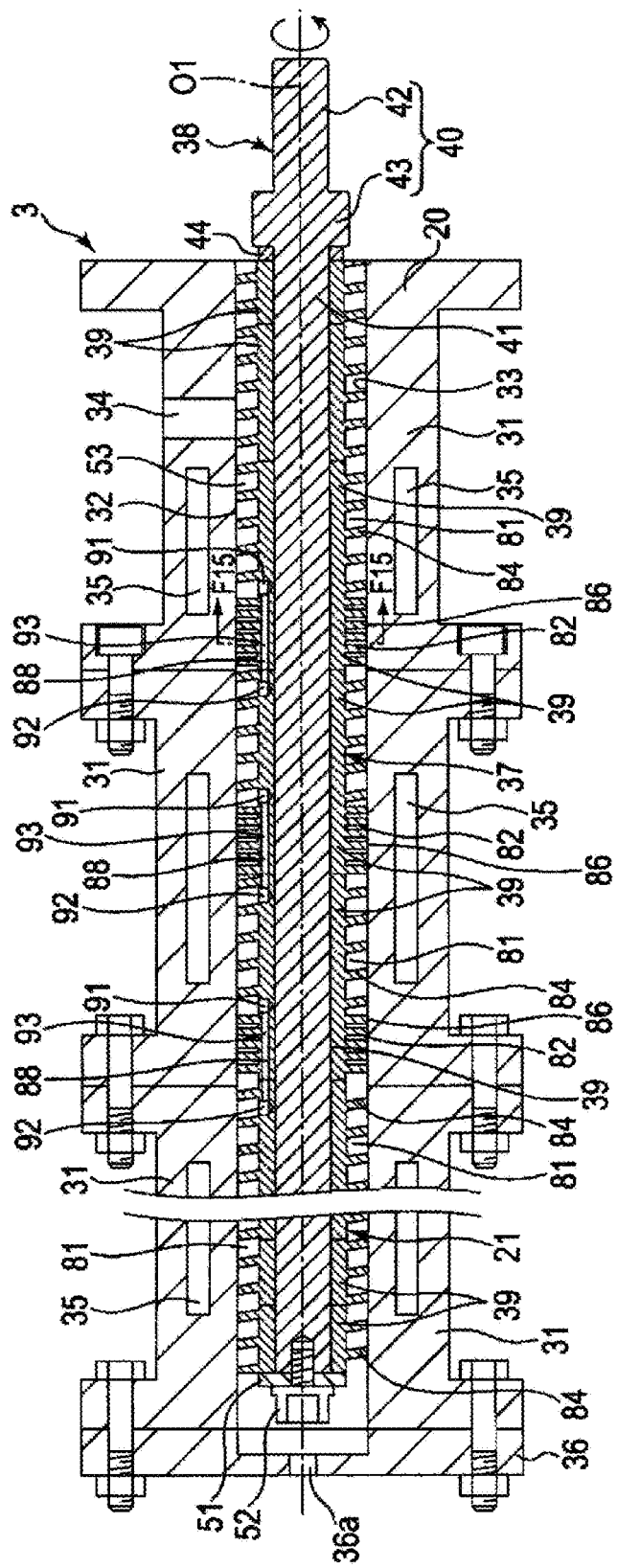
FIG. 6 is a cross-sectional view of the second extruder shown in FIG. 1, in which both a barrel and a screw are shown in cross section.

As shown in FIGS. 5 and 6, the barrel 20 of the second extruder 3 has a straight tubular shape and is arranged horizontally. The barrel 20 is divided into a plurality of barrel elements (barrels) 31.

Each barrel element 31 has a cylindrical through hole 32. The barrel elements 31 are integrally coupled by bolting so that the respective through holes 32 are coaxially continuous. The through holes 32 of the barrel elements 31 cooperate with each other to define a cylindrical cylinder portion 33 inside the barrel 20. The cylinder portion 33 extends in the axial direction of the barrel 20.

A supply port 34 is formed at one end of the barrel 20 along the axial direction. The supply port 34 communicates with the cylinder portion 33, and the raw material melted by the first extruder 2 is continuously supplied to the supply port 34.

The barrel 20 includes a heater (not shown). The heater adjusts the temperature of the barrel 20 as necessary so that the temperature of the barrel 20 reaches the optimum value for kneading the raw material. Furthermore, the barrel 20 includes a refrigerant passage 35 through which a refrigerant such as water or oil flows. The refrigerant passage 35 is arranged so as to surround the cylinder portion 33. The refrigerant flows along the refrigerant passage 35 when the temperature of the barrel 20 exceeds a predetermined upper limit value, and forcibly cools the barrel 20.

The other end of the barrel 20 along the axial direction is closed by a head portion 36. The head portion 36 has a discharge port 36a. The discharge port 36a is located on a side of the barrel 20 along the axial direction opposite to the supply port 34, and is connected to the third extruder 4.

The screw 21 for an extruder has a linear axis along the transport direction of the raw material and includes a screw body 37. The screw body 37 of the embodiment is configured by one rotating shaft 38 and a plurality of cylindrical cylinders 39.

The rotating shaft 38 includes a first shaft portion 40 and a second shaft portion 41. The first shaft portion 40 is located at a base end of the rotating shaft 38, which is on the side of one end of the barrel 20. The first shaft portion 40 includes a joint portion 42 and a stopper portion 43. The joint portion 42 is connected to a drive source such as a motor via coupling (not shown). The stopper portion 43 is arranged coaxially with the joint portion 42. The stopper portion 43 has a larger diameter than that of the joint portion 42.

The second shaft portion 41 extends coaxially from the end surface of the stopper portion 43 of the first shaft portion 40. The second shaft portion 41 has a length over substantially the entire length of the barrel 20, and has a front end facing the head portion 36. A straight axis O1 coaxially penetrating the first shaft portion 40 and the second shaft portion 41 extends horizontally in the axial direction of the rotating shaft 38.

Figure 7:
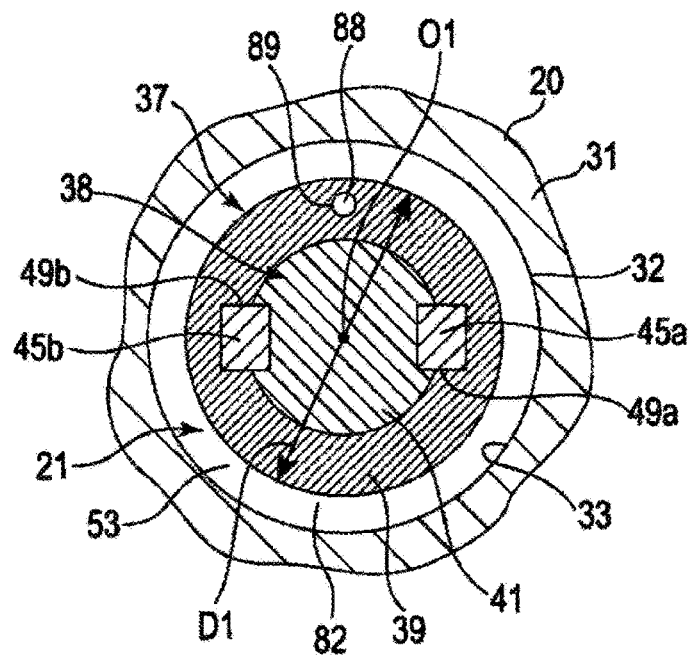
FIG. 7 is a cross-sectional view taken along line F15-F15 in FIG. 6.

The second shaft portion 41 is a solid columnar shape having a diameter smaller than that of the stopper portion 43. As shown in FIG. 7, a pair of keys 45a and 45b are attached to the outer peripheral surface of the second shaft portion 41. The keys 45a and 45b extend in the axial direction of the second shaft portion 41 at positions shifted by 180° in the circumferential direction of the second shaft portion 41.

Figure 8:
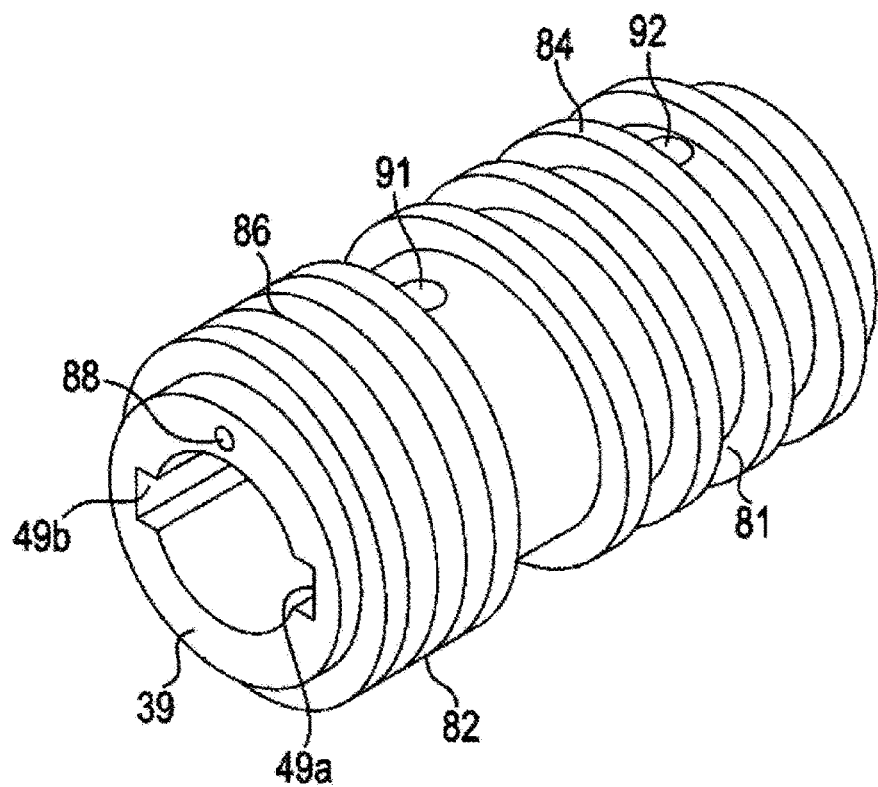
FIG. 8 is a perspective view of a cylinder.

As shown in FIGS. 7 and 8, each cylinder 39 is configured in a manner that the second shaft portion 41 penetrates coaxially. A pair of key grooves 49a and 49b are formed on the inner peripheral surface of the cylinder 39. The key grooves 49a and 49b extend in the axial direction of the cylinder 39 at positions shifted by 180° in the circumferential direction of the cylinder 39.

The cylinder 39 is inserted onto the second shaft portion 41 from a direction of the front end of the second shaft portion 41 in a state that the key grooves 49a and 49b are aligned with the keys 45a and 45b of the second shaft portion 41. In the embodiment, a first collar 44 is interposed between the cylinder 39 first inserted onto the second shaft portion 41 and the end surface of the stopper portion 43 of the first shaft portion 40. Furthermore, after all the cylinders 39 are inserted onto the second shaft portion 41, a fixing screw 52 is screwed into the front end surface of the second shaft portion 41 via a second collar 51 (see FIGS. 5 and 6).

By the screwing, all the cylinders 39 are tightened in the axial direction of the second shaft portion 41 between the first collar 44 and the second collar 51, and the end surfaces of the adjacent cylinders 39 are in close contact with each other without a gap.

The screw body 37 has, as screw elements, a plurality of transport portions 81 for transporting raw materials and a plurality of barrier portions 82 for restricting the flow of the raw materials. That is, a plurality of transport portions 81 are arranged at the base end of the screw body 37 corresponding to one end of the barrel 20, and a plurality of transport portions 81 are arranged at the front end of the screw body 37 corresponding to the other end of the barrel 20. Furthermore, between these transport portions 81, the transport portions 81 and the barrier portions 82 are arranged alternately in the axial direction from the base end toward the front end of the screw body 37. The number of times of repeating the steps for reducing the molecular weight of the high molecular weight polymer to obtain the low molecular weight polymer is determined by the number at which the transport portion 81 and the barrier portion 82 are arranged as a set. The transport portion 81 and the barrier portion 82 may have either a configuration in which only one set is arranged or a configuration in which a plurality of sets are arranged. In each case, by passing through the passage 88 (see FIGS. 5 and 6) immediately after reducing the molecular weight of the high molecular weight polymer to cool the high molecular weight polymer and the low molecular weight polymer (appropriately referred to as "the polymer" if the two are not distinguished), the thermal deterioration of these polymers can be suppressed. Moreover, the supply port 34 of the barrel 20 is open toward the transport portion 81 arranged on the base end side of the screw body 37.

Each transport portion 81 has a flight 84 that is spirally twisted. The flight 84 projects toward a transport path 53 from the outer peripheral surface of the cylinder 39 along the circumferential direction. The flight 84 is twisted so as to transport the raw material from the base end toward the front end of the screw body 37 when the screw 21 is rotated counterclockwise when viewed from the base end of the screw body 37. That is, the flight 84 is twisted to the right in the same twisting direction as the right-handed screw.

Each barrier portion 82 has a flight 86 that is spirally twisted. The flight 86 projects toward the transport path 53 from the outer peripheral surface of the cylinder 39 along the circumferential direction. The flight 86 is twisted so as to transport the raw material from the front end toward the base end of the screw body 37 when the screw 21 is rotated counterclockwise when viewed from the base end of the screw body 37. That is, the flight 86 is twisted to the left in the same twisting direction as the left-handed screw, and has a reverse screw in the direction opposite to that of the flight 84.

The twist pitch of the flight 86 of each barrier portion 82 is set to be the same as or smaller than the twist pitch of the flight 84 of the transport portion 81. Furthermore, a slight clearance is secured between the top portions of the flights 84 and 86 and the inner peripheral surface of the cylinder portion 33 of the barrel 20.

Figure 9:
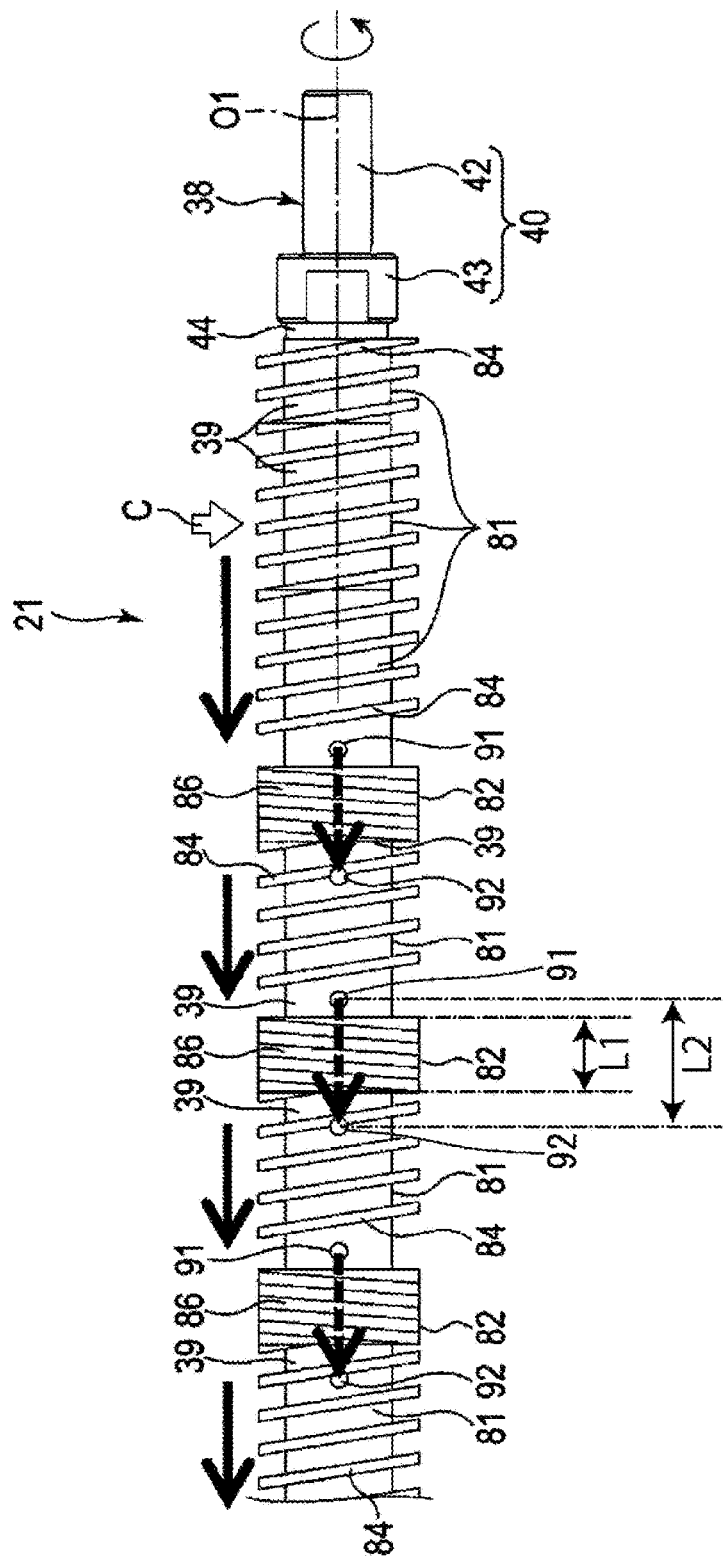
FIG. 9 is a side view showing a flow direction of a raw material with respect to the screw.

As shown in FIGS. 5, 6 and 9, the screw body 37 has, as screw elements, a plurality of passages 88 extending in the axial direction of the screw body 37. When one barrier portion 82 and two transport portions 81 sandwiching the barrier portion 82 are set as one unit, the passage 88 is formed in a manner of straddling the barrier portion 82 of each unit on the cylinders 39 of both transport portions 81. In this case, the passages 88 are arranged in a row at predetermined intervals (for example, at equal intervals) on the same straight line along the axial direction of the screw body 37. The passage 88 is arranged in the barrier portion 82 sandwiched by the transport portions 81, and cools the polymer during the molecular weight reduction in the transport portion 81 to suppress the thermal deterioration.

Furthermore, the passage 88 is arranged at a position eccentric from the axis O1 of the rotating shaft 38 inside the cylinder 39. In other words, the passage 88 is deviated from the axis O1 and revolves around the axis O1 when the screw body 37 rotates.

As shown in FIG. 7, the passage 88 is, for example, a hole having a circular cross-sectional shape. The passage 88 is configured as a hollow space that allows only the flow of the raw material. A wall surface 89 of the passage 88 revolves around the axis O1 without spinning about the axis O1 when the screw body 37 rotates.

When the passage 88 is set as a hole having a circular cross-sectional shape, the diameter of the circle may be set to, for example, about 1 to 5 mm, and more preferably about 1 to 3 mm. In addition, the distance (length) of the passage 88 may be set to, for example, about 15 to 90 mm. From the viewpoint of smoothly passing the raw material polymer, cooling the polymer during the passage, and increasing the filling rate in the transport portions 81, the diameter of the circle in the cross section of the passage 88 is preferably 1 to 3 mm, and the distance of the passage 88 is preferably 40 to 60 mm.

Figure 10:
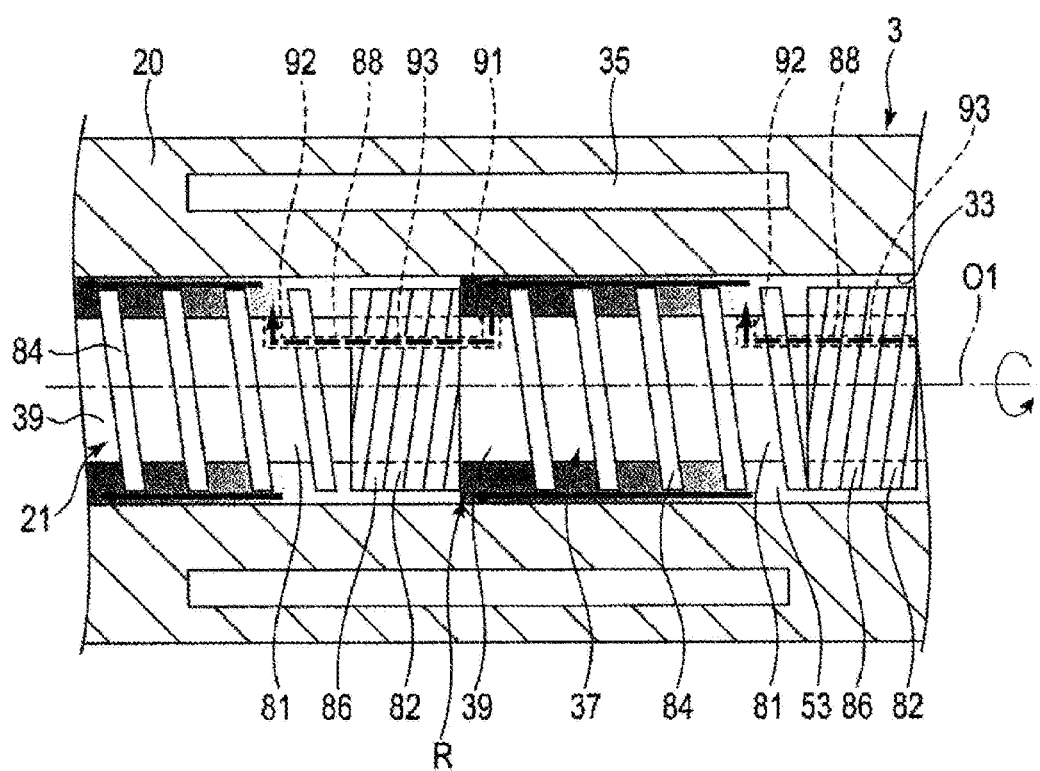
FIG. 10 is a cross-sectional view of the second extruder roughly showing a flow direction of the raw material when the screw is rotated.

As shown in FIG. 10, each passage 88 has an inlet 91, an outlet 92, and a passage body 93. The inlet 91 and the outlet 92 are communicated with each other by the passage body 93, and are arranged close to two sides of one barrier portion 82. In other words, in one transport portion 81 adjacent between two adjacent barrier portions 82, the inlet 91 is opened on the outer peripheral surface near the downstream end of the transport portion 81 and the outlet 92 is opened on the outer peripheral surface near the upstream end of the transport portion 81. The inlet 91 and the outlet 92 opened on the outer peripheral surface of one transport portion 81 are not communicated with each other by the passage body 93. The inlet 91 is communicated with the outlet 92 of the adjacent downstream transport portion 81 via the barrier portion 82, and the outlet 92 is communicated with the inlet 91 of the adjacent upstream transport portion 81 via the barrier portion 82.

No shear force from the screw 21 is applied to the polymer when the polymer passes through the passage 88. Accordingly, because a shear force is intermittently applied to the polymer, thermal deterioration of the polymer can be suppressed. In order to enhance the cooling effect when the polymer passes through the passage 88, a refrigerant passage (not shown) extending coaxially along the axis O1 of the rotating shaft 38 may be formed inside the rotating shaft 38.

When forming the refrigerant passage, one end thereof may be connected to an outlet pipe, and the other end may be closed by the front end of the rotating shaft 38 in a liquid-tight manner. A refrigerant introduction pipe may be inserted coaxially inside the refrigerant passage. Thereby, the refrigerant circulates along the axial direction of the rotating shaft 38, and thus the polymer can be efficiently cooled when the refrigerant passes through the passage 88 using the refrigerant.

In FIG. 10, the filling rate of the raw material at a site of the transport portion 81 corresponding to the transport portion 81 of the screw body 37 is represented by gradation (shade). That is, in the transport portion 81, the darker the color tone, the higher the filling rate of the raw material. As is clear from FIG. 10, in the transport portion 81, the filling rate of the raw material increases as it approaches the barrier portion 82, and the filling rate of the raw material is 100% immediately before the barrier portion 82. In this way, a high shear force is applied by the rotation of the screw 21 to the high molecular weight polymer having a filling rate of about 100% in the vicinity of a raw material reservoir R. Thereby, the high molecular weight polymer can be reduced in molecular weight to obtain a low molecular weight polymer having a melt flow rate that can be used for producing a non-woven fabric by the melt-blown method.

Immediately before the barrier portion 82, the "raw material reservoir R" is formed in which the filling rate of the raw material is 100%. In the raw material reservoir R, the pressure of the raw material is increasing because the flow of the raw material is dammed. As shown by the broken line arrows in FIG. 10, the raw material whose pressure has increased continuously flows into the passage 88 from the inlet 91 opened on the outer peripheral surface of the transport portion 81, and continuously flows in the passage 88. The filling length, which is the length at which the raw material is filled along the transport direction, is defined by the positional relationship between the passage 88 and the barrier portion 82.

The passage cross-sectional area defined by the bore diameter (inner diameter) of the passage 88 is much smaller than the annular cross-sectional area of the transport portion 81 along the radial direction of the cylinder portion 33. In other words, the spread region based on the bore diameter of the passage 88 is much smaller than the spread area of the annular transport path 53.

Figure 11:
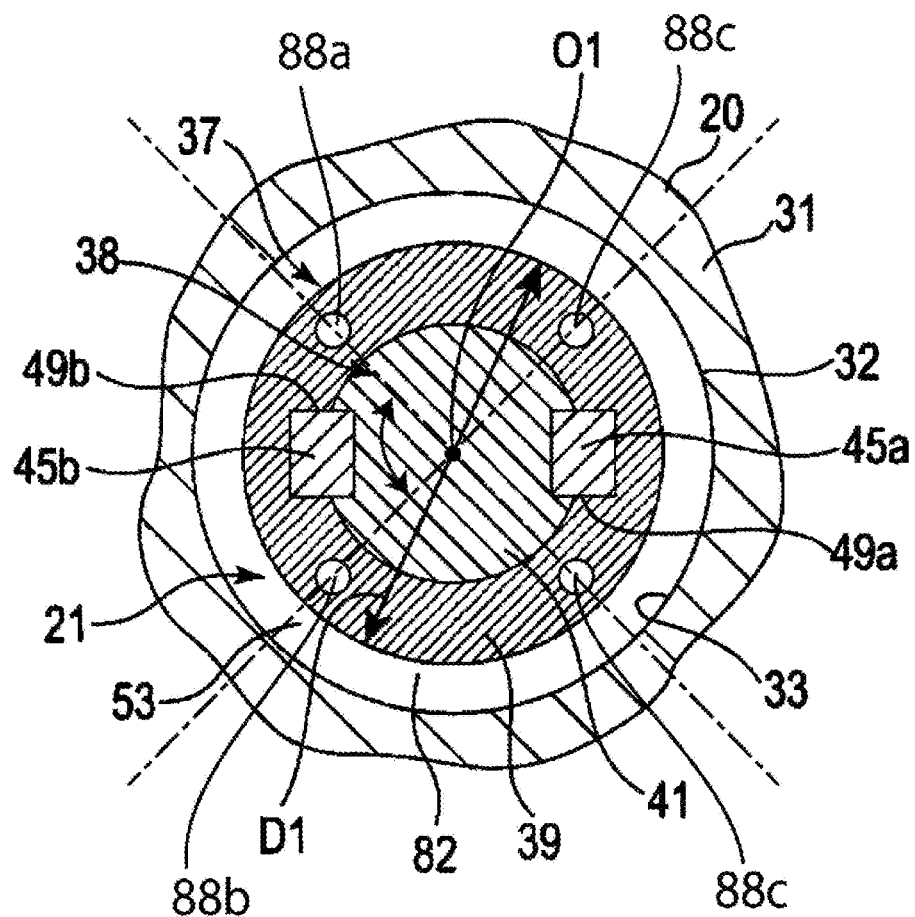
FIG. 11 is a cross-sectional view of a part corresponding to FIG. 7, showing an example in which a plurality of passages are arranged side by side in parallel.

As shown in FIG. 11, it is preferable that a plurality of passages 88 are arranged in parallel inside the screw body 37. When a plurality of passages 88 are arranged, it is preferable to evenly arrange the plurality of passages 88 on the screw body 37. With this configuration, it is possible to improve the cooling efficiency and obtain a low molecular weight polymer having a small MFR. In this case, each of the inlet 91 and the outlet 92 (see FIG. 8) of the passage 88 is also arranged evenly on the outer peripheral surface of the screw body 37.

FIG. 11 shows an example in which four passages 88a, 88b, 88c, and 88d are arranged in parallel inside the screw body 37. As shown in the diagram, evenly arranging a plurality of passages 88 means that the angle of lines connecting the axis (center point) O1 of the cross section of the screw body 37 and the adjacent passages 88 is equal. The angle of the lines connecting O1 and the adjacent passages 88 is 90° when there are four passages 88 and is 180° when there are two passages 88. Moreover, D1 indicates the outer diameter of the screw body 37.

As shown by an arrow C in FIG. 9, the raw material supplied to the second extruder 3 is charged into the outer peripheral surface of the transport portion 81 located on the base end side of the screw body 37. At this time, when the screw 21 rotates counterclockwise to the left when viewed from the base end of the screw body 37, the flight 84 of the transport portion 81 continuously transports the raw material toward the front end of the screw body 37 as shown by the solid line arrows in FIG. 9.

In the embodiment, the plurality of transport portions 81 and the plurality of barrier portions 82 are alternately arranged in the axial direction of the screw body 37, and the plurality of passages 88 are arranged at intervals in the axial direction of the screw body 37. Therefore, as shown by the arrows in FIGS. 9 and 10, the raw material charged from the supply port 34 into the screw body 37 is alternately and repeatedly subjected to the shearing action and the cooling action, and is continuously transported in the direction from the base end to the front end of the screw body 37.

Conditions for reducing the molecular weight include the rotation speed of the screw body 37, the inner diameter and the distance of the passage 88, and the number of times of alternately repeating the shearing action and the cooling action. In the present invention, the number of times of restricting the transport is the same as the number of barrier portions 82 sandwiched and arranged between the screw main bodies 37 in the second extruder 3, and is defined by the number of the barrier portions 82 in which the passage 88 between the screw bodies 37 is arranged.

The screw 21 rotates by receiving a torque from the drive source. The rotation speed of the screw 21 suitable for producing a low molecular weight polymer suitable for the melt-blown method differs depending on the outer diameter of the screw 21. Generally, as the outer diameter of the screw 21 becomes smaller, the suitable rotation speed tends to increase. When a screw 21 having an outer diameter of 30 mm or more and 50 mm or less is used, the rotation speed of the screw 21 is preferably 2000 to 6000 rpm, and more preferably 2000 to 4000 rpm.

In the embodiment, as shown in FIG. 9, the transport direction of the raw material in the transport portion 81 indicated by the solid line arrows and the flow direction of the raw material in the passage 88 indicated by the broken line arrows are the same. In addition, the inlet 91 of the passage 88 is arranged near the end on the downstream side (front end side, left side when facing FIG. 9) of the transport portion 81, and the outlet 92 is arranged near the end on the upstream side of the downstream transport portion 81 adjacent via the barrier portion 82. In this way, because a length L2 of the passage 88 straddling the barrier portion 82 is short, the flow resistance when the raw material passes through the passage 88 becomes low. Therefore, the production method of the embodiment is suitable as a production method for reducing the molecular weight of a high molecular weight polymer having a high viscosity.

The length L2 of the passage 88 needs to be larger than a length L1 of the barrier portion 82 straddled by the passage 88, but from the viewpoint of reducing the flow resistance when the raw material passes through the passage 88, the length L2 of the passage 88 is preferably 2 times or less, more preferably 1.5 times or less, and further preferably 1.3 times or less the length L1 of the barrier portion 82 straddled by the passage 88.

Besides, the high molecular weight polymer serving as a raw material that has reached the front end of the screw body 37 becomes a low molecular weight polymer that has been sufficiently reduced in molecular weight and is continuously supplied from the discharge port 36a to the third extruder 4, and the gaseous substances and other volatile components contained in the kneaded product are continuously removed from the kneaded product.

As described above, in the high shearing device 1 of the embodiment, the barrier portion 82 for damming the polymer is arranged in a part of the single-axis screw 21 configured to be rotatable at a high speed. Besides, the high shearing device 1 is a single-screw extruder having a structure in which the raw material including the high molecular weight polymer of the raw material reservoir R dammed by the barrier portion 82 passes through the passage 88 arranged across the barrier portion 82. The first extruder 2 such as a twin-screw extruder is connected to the upstream of the high shearing device 1, and the resin melted and mixed by the first extruder 2 is charged into the high shearing device 1.

Because the screw 21 of the high shearing device 1 is configured to be rotatable at a high speed, a large shear force can be applied to the resin for the raw material including the high molecular weight polymer of the raw material reservoir R. Here, being rotatable at a high speed means being rotatable at, for example, about 5000 rpm (rotation/minute). Because the raw material is fully filled near the inlet 91 of the passage 88 in the raw material reservoir R, a large shear force is applied to the raw material including the high molecular weight polymer at this part. Thus, in order to realize sufficient molecular weight reduction of the high molecular weight polymer, it is preferable to increase the number of the barrier portions 82 or reduce the inner diameter of the passage 88. However, if the temperature of the polymer rises too much due to the heat generated by shearing, the oxidation reaction may proceed excessively and adversely affect the physical properties of the low molecular weight polymer. Therefore, the resin is cooled by passing through the passage 88 having an inner diameter of an appropriate size to suppress heat generation, thereby suppressing thermal deterioration of the low molecular weight polymer due to excessive oxidation reaction.

Production Device for Melt-Blown Non-Woven Fabric

Easily available general-purpose polymers are usually produced by stirring a monomer and a catalyst in a large tank referred to as a polymerization reactor to polymerize the monomer. Because this production method is suitable for mass production, high-volume grade polymers for applications of injection molding, extrusion molding, and the like can be obtained at low cost on the market.

However, ultra-low-viscosity polymers having a very low viscosity and used for producing melt-blown non-woven fabrics are in lower demand than the general-purpose polymers, and thus the production cost is higher than that of the general-purpose polymers with high demand when the ultra-low-viscosity polymers are produced using a polymerization reactor for mass production. Therefore, the distribution amount of the ultra-low viscosity polymers of a grade that can be used as a raw material for melt-blown non-woven fabrics is small, and the transaction price is higher than that of the general-purpose polymers. Therefore, it has been studied to reduce the molecular weight of a general-purpose polymer that can be obtained at a low price to obtain an ultra-low viscosity polymer used for producing a melt-blown non-woven fabric.

The method for reducing the molecular weight of a general-purpose polymer may be a method of adding a molecular weight reducing agent such as an organic peroxide to a general-purpose polymer such as polypropylene resin and passing the general-purpose polymer through a heated extruder for thermal decomposition (for example, see Non-patent literature 1).

However, because the molecular weight reducing agent such as a peroxide is a highly reactive substance, it is difficult to quickly and uniformly knead the molecular weight reducing agent and the general-purpose polymer. Therefore, there is a problem that the decomposition of the general-purpose polymer proceeds only in the vicinity of the peroxide in the extruder, and the molecular weight distribution after the molecular weight reduction tends to spread.

In addition, when a molecular weight reducing agent is used, the molecular weight reduction is affected not only by the extrusion conditions but also by the addition amount of the molecular weight reducing agent and the degree of kneading, and thus it is technically not easy to control the molecular weight of the polymer after the molecular weight reduction. Because it is technically difficult to continuously change the control of the molecular weight in this way, adjustment of the physical properties of the non-woven fabric through adjustment of the molecular weight has not been made so far.

Furthermore, when a molecular weight reducing agent is added to a general-purpose polymer to reduce the molecular weight, decomposition products and the like of the molecular weight reducing agent are generated during thermal decomposition. These decomposition products may generate smoke during the production of the non-woven fabric by the melt-blown method and cause deterioration of the working environment. In addition, because the decomposition products cause yellowing and odor of the melt-blown non-woven fabric, the raw material to which the molecular weight reducing agent is added is not suitable for producing sanitary products such as masks.

The sources of raw materials for non-woven fabric differ greatly depending on the application. For example, non-woven fabrics for agriculture are not required to have the same purity as masks and are used in large quantities, and thus these non-woven fabrics are produced using raw materials obtained by decomposing high molecular weight raw materials with a peroxide in a twin-screw extruder. On the other hand, non-woven fabrics such as masks that come into contact with human skin need to use high-purity raw materials in order to avoid offensive odors and allergic reactions. Therefore, these non-woven fabrics such as masks are produced by a polymerization reactor in a chemical plant, but the raw material for masks is expensive due to the small amount of production, and the demand fluctuates throughout the year due to the seasonal influence such as the amount of pollen scattered. As described above, because the seasonal demand for non-woven fabrics fluctuates greatly, a production device for non-woven fabric suitable for high-mix low-volume production is required, which is capable of using the same raw materials to produce non-woven fabrics suitable for different applications.

According to the present invention, it is possible to provide a production device and a production method for melt-blown non-woven fabric suitable for high-mix low-volume production, which can continuously perform molecular weight reduction of an easily available general-purpose polymer instead of a special grade ultra-low viscosity polymer and formation of a melt-blown non-woven fabric.

FIG. 17 is a schematic diagram showing the outline of the configuration of a device 100 of the embodiment. The device 100 is a production device for melt-blown non-woven fabric which reduces the molecular weight of a raw material polymer and uses the low molecular weight polymer that has been reduced in molecular weight to form a non-woven fabric by a melt-blown method. The melt-blown method is a melt-spinning method in which a thermoplastic resin extruded from a nozzle head of a die is stretched in a fibrous form by being blown with hot air, and accumulated on a conveyor to form a web by self-bonding. Hereinafter, the non-woven fabric formed by the melt-blown method is referred to as melt-blown non-woven fabric, and is appropriately abbreviated as non-woven fabric.

The device 100 includes the above-described high shearing device 1, a filter 102, a gear pump 103, a die (melt-blown die) 104, a nozzle head 105, a hot air supply part 106, a belt conveyor 107, a winding device 108, and a viscosity measurement portion 109.

The second extruder 3 of the high shearing device 1 (see FIGS. 1, 4, 5 and 10) includes a barrel 20 and a screw 21. The barrel 20 has a straight tubular shape and is arranged horizontally. A shear force is applied to the high molecular weight polymer serving as a raw material by the rotation of the screw 21 and the high molecular weight polymer is reduced in molecular weight to become a low molecular weight polymer, and the low molecular weight polymer is supplied to the die 104 from the discharge port 28 of the head portion 27 of the third extruder 4 via the filter 102 and the gear pump 103. By using the high shearing device 1 as a resin supply part, molecular weight reduction of the high molecular weight polymer and formation of a non-woven fabric using the low molecular weight polymer can be performed consistently.

By using the high shearing device 1, the high molecular weight polymer can be reduced in molecular weight without adding an additive such as a molecular weight reducing agent. Because the additive for molecular weight reduction is not required, decomposition products of the additive that cause yellowing and odor of the non-woven fabric are not generated. Therefore, a non-woven fabric suitable for medical and sanitary purposes can be produced using the device 100.

In addition, because it is not necessary to adjust the conditions for molecular weight reduction, such as the addition amount of the additive, the degree of kneading and the like, the production cost of the melt-blown non-woven fabric can be suppressed. Furthermore, because the high shearing device 1 can control the molecular weight reduction by changing the set temperature of the barrel 20 and the rotation speed of the screw 21 to produce a low molecular weight polymer having a desired molecular weight, various non-woven fabrics can be developed and produced.

The filter 102 is supplied with a low molecular weight polymer such as a thermoplastic resin from the high shearing device 1 and removes foreign matter from the low molecular weight polymer before being sent to the gear pump 103. The gear pump 103 applies pressure to the low molecular weight polymer to continuously supply a predetermined amount of low molecular weight polymer to the die 104. The low molecular weight polymer supplied from the gear pump 103 is extruded from a pore 151 (see FIG. 18) included in the nozzle head 105 of the die 104 toward the belt conveyor 107 for non-woven fabric collection by the hot air such as a high-speed air flow supplied from the hot air supply part 106.

FIG. 18 is a partial cross-sectional view of the nozzle head 105. A large number of pores 151 of the nozzle head 105 are arranged side by side in a direction (Z-axis direction) perpendicular to the head cross section of FIG. 18, and slits 152 which are blow-out openings of the hot air are arranged along the direction perpendicular to the head cross section on both sides of the pores 151 (both sides in the X-axis direction). The low molecular weight polymer extruded from the pores 151 is stretched by high-speed hot air blown out from the slits 152 on both sides so as to sandwich the outlets of the pores 151, and becomes a fine fibrous form. The resin that is stretched out of the large number of pores 151 arranged side by side and becomes fibrous is accumulated and transported on the belt conveyor 107 traveling at a constant speed to become a non-woven fabric. The non-woven fabric on the belt conveyor 107 is wound in a roll shape by the winding device 108.

The conditions for supplying hot air to the low molecular weight polymer extruded from the nozzle head 105 of the die 104 and stretching the low molecular weight polymer into a fibrous form to obtain a non-woven fabric may be appropriately set according to the properties of the target non-woven fabric. For example, the die temperature may be 200 to 400° C., the hot air temperature may be 200 to 400° C., and the hot air volume may be 50 to 300 $Nm^3/hr$.

Because the screw 21 (see FIGS. 5, 6 and 9) of the high shearing device 1 is configured to be rotatable at a high speed, a large shear force can be applied to the high molecular weight polymer. Here, because the resin is fully filled near the inlet 91 of the passage 88 (see FIG. 10), a large shear force is applied to this part. Thus, in order to realize sufficient molecular weight reduction of the high molecular weight polymer, it is preferable to reduce the inner diameter of the passage 88. However, if the temperature of the polymer rises too much due to the heat generated by shearing, the oxidation reaction may proceed excessively and adversely affect the physical properties of the polymer. Therefore, the polymer is cooled by passing through a passage 88 having an inner diameter of an appropriate size to suppress heat generation, and the molecular weight reduction is controlled while deterioration of the physical properties of the polymer due to excessive oxidation reaction is prevented.

The low molecular weight polymer reduced in molecular weight in the raw material reservoir R passes through the passage 88 arranged across the barrier portion 82 in the axial direction inside the screw 21 and moves to the third extruder 4 side in the second extruder 3. In this way, by arranging the passage 88 in the vicinity of the raw material reservoir R, it is possible to pass the polymer through the passage 88 following the molecular weight reduction to cool the polymer and suppress the deterioration due to heat.

As shown in FIG. 17, the control portion 116 that controls the high shearing device 1 includes a rotation speed setting portion 117 that sets the rotation speed of the screw body 37 in the screw 21 and a temperature setting portion (barrel temperature setting unit) 118 that sets the temperature in the high shearing device 1. Therefore, after deciding the configuration of the screw 21, the rotation speed of the screw 21 and the temperature of the barrel 20 which are easily changed can be changed, and the low molecular weight polymers having different molecular weights can be supplied to the die 104 to produce non-woven fabrics suitable for various uses.

In addition, the device 100 includes a viscosity measurement portion 109 between the high shearing device 1 and the filter 102. The viscosity measurement portion 109 measures the viscosity of the low molecular weight polymer reduced in molecular weight by the high shearing device 1, and transmits the measurement result to the control portion 116. Therefore, the rotation speed of the screw 21 and the temperature of the barrel 20 can be adjusted based on the viscosity of the low molecular weight polymer measured by the viscosity measurement portion 109. In addition, the MFR of the low molecular weight polymer can be estimated based on the measured viscosity.

The viscosity measurement portion 109 can be configured using, for example, a single tube, a pressure gauge, and a thermocouple. In this case, the viscosity of the low molecular weight polymer can be measured based on the pressure difference measured by the pressure gauges respectively arranged at the upstream and downstream ends of the low molecular weight polymer of the single tube, the temperature measured by the thermocouple, and the extrusion amount. Moreover, the thermocouple may be arranged at one of both ends of the single tube. The single tube may be a linear or U-shaped one, and may have a configuration in which slits are formed at the ends on both sides (inlet and outlet) and the slits are opened when the viscosity is measured. In addition, the position where the viscosity measurement portion 109 is set is not limited to the place shown in FIG. 17. For example, the position may be set between the filter 102 and the gear pump 103.

As described above, by using the high shearing device 1 as a resin supply part, the melt-blown non-woven fabric can be produced by applying a shear force to the high molecular weight polymer that does not contain a molecular weight reducing agent to obtain a low molecular weight polymer that has been reduced in molecular weight, supplying hot air to the low molecular weight polymer extruded from the die, and stretching the polymer in a fibrous form to obtain a non-woven fabric. Therefore, the low molecular weight polymer can be produced from a general-purpose polymer only under extrusion conditions such as the rotation speed and the barrel temperature without worrying about the addition amount of peroxides, the degree of kneading, the decomposition residue, and the like. Therefore, the production cost of the melt-blown non-woven fabric is low, and different from the method of adding a peroxide or the like for thermal decomposition, the melt-blown non-woven fabric that can also be used for medical and sanitary purposes can be produced.

EXAMPLE

In the production of the low molecular weight polymer of examples, the device described in the embodiment with reference to FIGS. 1 to 11 was used. A molten raw material was produced by supplying the raw material to the first extruder 2 in which an effective screw length of the kneading portion 12 with respect to an effective screw length (screw length/screw diameter) 48 is set to 8 and preliminarily kneading the raw material. Then, the molten raw material was continuously supplied from the first extruder 2 to the second extruder 3 as the high molecular weight polymer serving as a raw material of the second extruder 3, and the molecular weight was reduced to produce a low molecular weight polymer.

The specifications of the second extruder 3 and production conditions common to the high shearing device used in Examples 1 to 5 are described below.

High Shearing Device

Screw diameter (outer diameter) of barrel unit: 48 mm
Effective screw length (L/D) of barrel unit: 6.25 to 18.75
Passage length (L2, see FIGS. 9 and 12): 45 mm
Raw material supply amount: 4.8 kg/h
Number of dams: 1

In Examples 1 to 5, the low molecular weight polymer was produced using a high shearing device in which the passage 88 is arranged across one barrier portion 82 between two screw bodies 37, that is, the number of barrier portions 82 (the number of dams) is 1, in order to shorten the time required for reducing the molecular weight and prevent the polymer from being oxidized due to thermal deterioration as much as possible.

Figure 12:
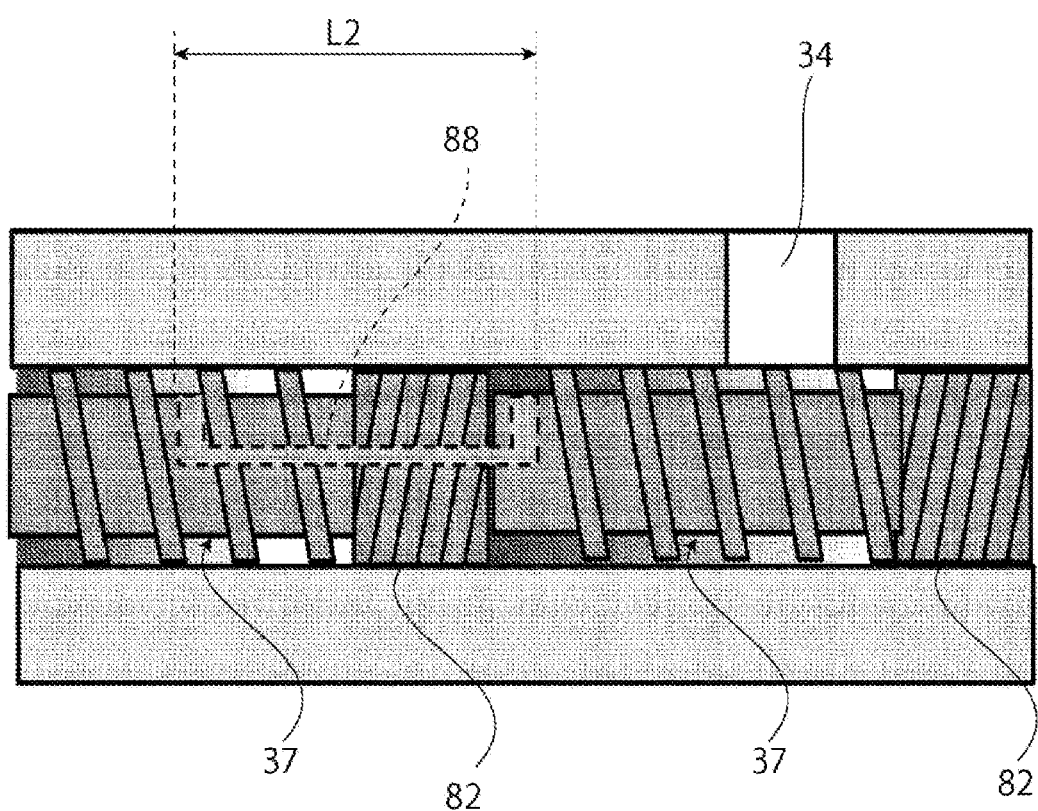
FIG. 12 is a diagram schematically showing an internal structure of the second extruder in a high shearing device used in an example.

FIG. 12 is a diagram schematically showing an internal structure of the second extruder 3 in the high shearing device used in Examples 1 to 5. As shown in the diagram, the high molecular weight polymer serving as a raw material supplied from the supply port 34 is reduced in molecular weight by the rotation of the screw bodies 37, and is cooled when passing through the passage 88 between the screw bodies 37. By intermittently applying the shear force from the screw body 37 to the polymer in this way, the thermal deterioration of the polymer due to the heat generated by shearing can be suppressed.

Example 1

By using the following device, the high molecular weight polymer was reduced in molecular weight to produce a low molecular weight polymer.

Raw Material

High molecular weight polymer
J108M (trade name, manufactured by Prime Polymer Co., Ltd., Mw 251,000, low-viscosity polypropylene)
F704NP (trade name, manufactured by Prime Polymer Co., Ltd., Mw 451,000, medium-viscosity polypropylene)
E105GM (trade name, manufactured by Prime Polymer Co., Ltd., Mw 1,130,000, high-viscosity polypropylene)

Device

High shearing device
Passage: Circular cross section, diameter ϕ 2 mm (4 pieces), barrel set temperature 195° C.
Rotation speed: 100, 500, 1000, 1500, 2000, 3600 rpm
As for the produced low molecular weight polymer, the weight average molecular weight (Mw) of simple polystyrene conversion measured using high temperature gel permeation chromatography (GPC) and the melt flow rate (MFR, JIS K7210-1 (B method)), indicating the value measured by this method under conditions of a weight of 2.16 kg and a temperature of 230° C., unless otherwise specified) are shown in Table 1.

TABLE 1

| MFR (g/10 min) | Raw material | Rotation speed (rpm: rotation/minute) | | | | | |
|---|---|---|---|---|---|---|---|
| | | 100 | 500 | 1000 | 1500 | 2000 | 3600 |
| J108M | 50.1 Mw: 251,000 | 55.9 | 78.0 | 141 | 238 | 377 Mw: 117,000 | 560 |
| F704NP | 9.15 Mw: 451,000 | 11.2 | 28.5 | 85.5 | 214 | 388 Mw: 113,000 | — |
| E105GM | 0.78 Mw: 1,130,000 | 1.13 | 9.62 | 44.2 | 194 | 357 Mw: 113,000 | — |

It was possible to produce a low molecular weight polymer obtained by reducing the molecular weight of the high molecular weight polymer using the high shearing device. In addition, it was possible to produce low molecular weight polymers having different MFRs by changing the rotation speed of the screw. By setting the rotation speed of the screw to 3000 rpm or more, a low molecular weight polymer exceeding MFR500 (g/10 min) suitable for producing a non-woven fabric by the melt-blown production method was obtained.

Example 2

Raw Material

High molecular weight polymer: J108M

Device

High shearing device
  Passage: Circular cross section, diameter φ 2 mm (1 piece)
  Barrel set temperature: 90, 130, 195, 230, 295° C.
  Rotation speed: 2000 rpm The results of measuring the melt flow rate of the produced low molecular weight polymer are shown in Table 2.

TABLE 2

| MFR (g/10 min) | Temperature (° C.) | | | | |
|---|---|---|---|---|---|
| | 90 | 130 | 195 | 230 | 295 |
| J108M | 103 | 111 | 166 | 229 | 358 |

It was found that the MFR of the obtained low molecular weight polymer is increased by increasing the barrel set temperature. However, when the high shearing device is used, the residence time of the polymer in the device is short, and thus the influence of heat on the polymer can be suppressed as compared with the case where the twin-screw kneading extruder is used.

Example 3

Raw Material

High molecular weight polymer: J108M

Device

High shearing device
  Passage: Circular cross section, diameter φ 4 mm (1 piece), diameter φ 2 mm (1 piece), diameter φ 2 mm (4 pieces)
  Barrel set temperature: 90° C., 195° C.
  Rotation speed: 100, 1000, 2000 rpm The results of measuring the melt flow rate of the obtained low molecular weight polymer are shown in Table 3.

TABLE 3

| MFR (g/10 min) | Barrel set temperature (° C.) | Rotation speed (rpm: rotation/minute) | | |
|---|---|---|---|---|
| | | 100 | 1000 | 2000 |
| Diameter φ 4 mm (1 piece) | 195 | 51.9 | 55.3 | 133 |
| Diameter φ 2 mm (1 piece) | 195 | 48.9 | 83.7 | 187 |
| Diameter φ 2 mm (4 pieces) | 195 | — | — | 179 |
| Diameter φ 4 mm (1 piece) | 90 | — | — | 69.9 |
| Diameter φ 2 mm (1 piece) | 90 | — | — | 103 |

When the rotation speed of the screw was 1000 rpm or more, it was possible to produce a low molecular weight polymer having a large MFR when the diameter φ of the passage is 2 mm compared with the case where the diameter φ is 4 mm. From this result, when the cross section of the passage is circular, the diameter of each passage is preferably 1/32 to 1/16 and more preferably 1/28 to 1/20 of the screw diameter (outer diameter) of the barrel unit. In addition, when the screw diameter (outer diameter) of the barrel unit is 45 to 55 mm, the diameter of each passage is preferably about 1 to 3 mm.

In addition, it was possible to produce a low molecular weight polymer having a larger MFR by evenly arranging four passages with a diameter φ of 2 mm in parallel inside the screw body. By arranging four passages with a diameter φ of 2 mm, the MFR was significantly increased as compared with the case where one passage with a diameter φ of 4 mm is arranged and the total cross-sectional area of the passages is the same. As a result, it is preferable to arrange a plurality of passages, and it is more preferable to arrange 3 to 5 passages in parallel.

Example 4

Raw Material

High molecular weight polymer: J108M

Device

High shearing device
  Through hole: Circular, diameter φ 2 mm (4 pieces)
  Rotation speed: 2000, 2500, 3000, 3600 rpm (rotation/minute)
  Barrel set temperature: 195° C.

Figure 13:
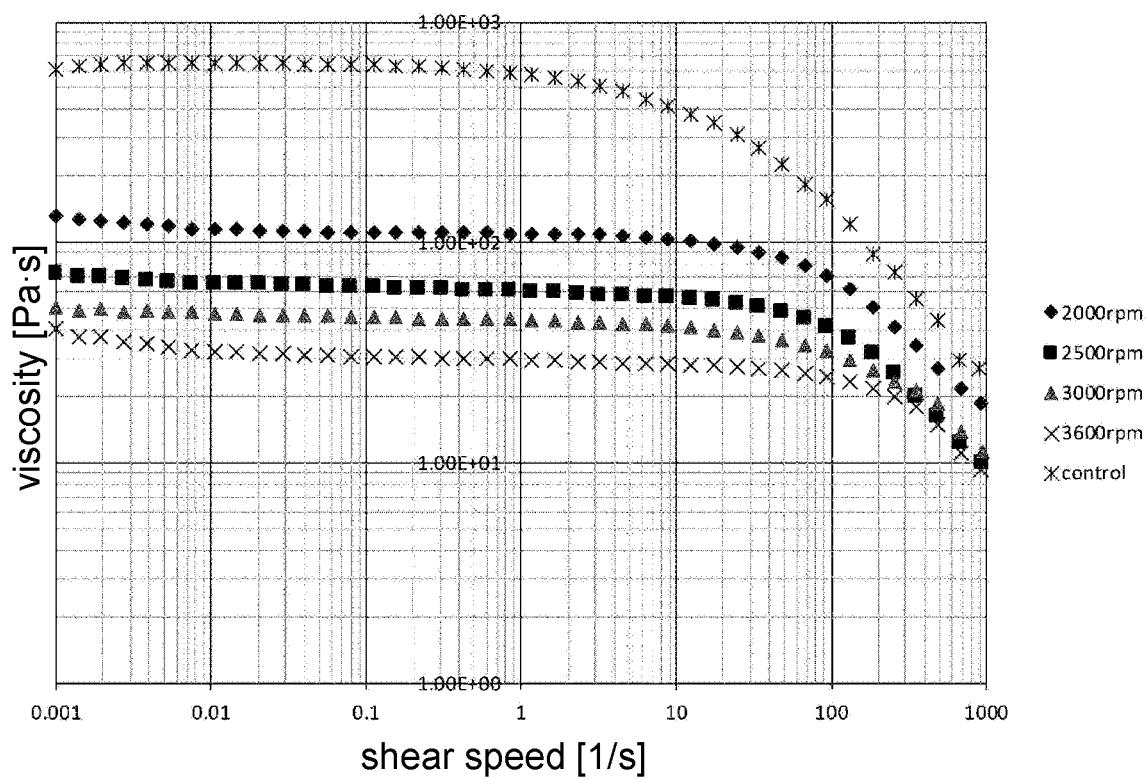
FIG. 13 is a graph showing the viscosity of a low molecular weight polymer obtained by molecular weight reduction of Example 4.

FIG. 13 is a graph showing the viscosity of the low molecular weight polymer obtained by reducing the molecular weight of the high molecular weight polymer. As shown in the diagram, a low molecular weight polymer of MFR560 (g/10 min) could be produced by setting the screw rotation speed to 3600 rpm. By the production method of the present invention, a low molecular weight polymer of MFR500 or higher suitable for producing a non-woven fabric by the melt-blown production method could be efficiently produced.

The weight average molecular weight (Mw), the number average molecular weight (Mn) and the polydispersity (Mw/Mn) of the obtained low molecular weight polymer are shown in Table 4 below.

TABLE 4

| Molecular weight | | Weight average molecular weight Mw | Number average molecular weight Mn | Polydispersity Mw/Mn |
|---|---|---|---|---|
| High molecular weight polymer (raw material) | | 251,000 | 60,300 | 4.2 |
| Screw rotation speed (rpm) | 2000 | 117,000 | 39,900 | 2.9 |
| | 2500 | 96,682 | 33,339 | 2.9 |
| | 3000 | 91,634 | 31,598 | 2.9 |
| | 3600 | 78,850 | 27,190 | 2.9 |

As shown in Table 4, the low molecular weight polymer produced using the high shearing device had a smaller degree of polydispersity than that of the high molecular weight polymer serving as a raw material. The low molecular weight polymer having a small degree of polydispersity has a low proportion at which the low molecular weight polymer with small molecular weight is contained, and thus yarn breakage is unlikely to occur during production. Therefore, it is suitable for producing a non-woven fabric by the melt-blown production method.

Example 5

Raw Material

High molecular weight polymer: E105GM

Device

High shearing device
  Through hole: Circular, diameter ϕ 2 mm (4 pieces)
  Rotation speed: 2000, 2500, 3000, 3600 rpm (rotation/minute)
  Barrel set temperature: 195° C.

Figure 14:
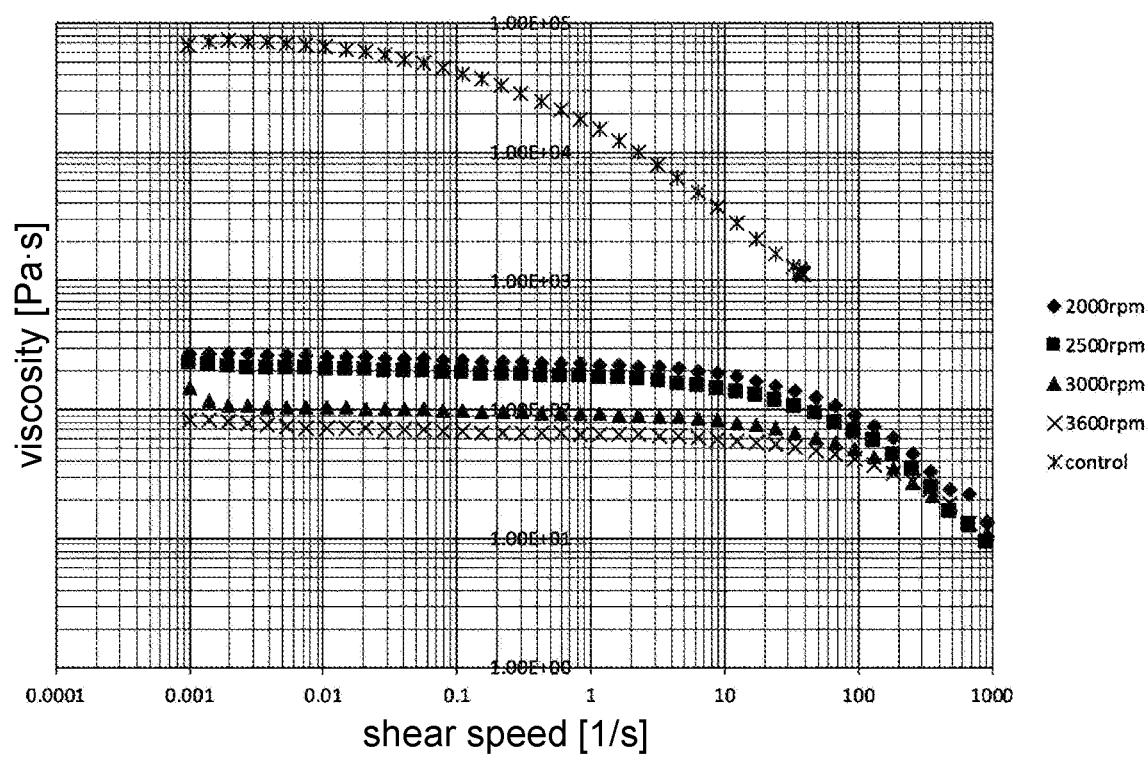
FIG. 14 is a graph showing the viscosity of a low molecular weight polymer obtained by molecular weight reduction of Example 5.

FIG. 14 is a graph showing the viscosity of the low molecular weight polymer obtained by reducing the molecular weight using the high shearing device. The weight average molecular weight (Mw), the number average molecular weight (Mn), and the polydispersity (Mw/Mn) of the obtained low molecular weight polymer are shown in the table below.

TABLE 5

| Molecular weight | | Weight average molecular weight Mw | Number average molecular weight Mn | Polydispersity Mw/Mn |
|---|---|---|---|---|
| High molecular weight polymer (raw material) | | 1,130,000 | 106,000 | 11 |
| Screw rotation speed (rpm) | 2000 | 113,000 | 39,900 | 2.9 |
| | 2500 | 105,636 | 36,426 | 2.9 |
| | 3000 | 87,534 | 30,184 | 2.9 |
| | 3600 | 78,290 | 26,996 | 2.9 |

As shown in Table 5, in Example 2 using the high-viscosity polypropylene (E105GM) as the raw material, a low molecular weight polymer having a small degree of polydispersity could also be produced as in Example 4 using the low-viscosity polypropylene (J108M).

Comparative Example 1

The high molecular weight polymer was reduced in molecular weight by using a twin-screw kneading extruder instead of the high shearing device of Example 1.

Raw Material

High molecular weight polymer: J108M, F704NP, E105GM

Device

Twin-screw kneading extruder (product name; TEM26 twin-screw kneading extruder, manufactured by Toshiba Machine Co., Ltd.)
  Screw rotation speed: 750 rpm
  Raw material supply amount: 10 kg/h
  Barrel set temperature: 195, 250, 300, 350° C.

The results of measuring the melt flow rate of the obtained polymer are shown in Table 6. The J108M treated at 350° C. shows the MFR estimated based on a calibration curve as in Example 6 described later.

TABLE 6

| MFR | Temperature (° C.) | | | |
|---|---|---|---|---|
| (g/10 min) | 195 | 250 | 300 | 350 |
| J108M | 57.8 | 76.1 | 223 | 2000 |
| F704NP | 13.0 | — | 67.0 | — |
| E105GM | 2.40 | — | 40.5 | — |

As shown in Table 6, low molecular weight polymers having different MFRs could be produced by using a twin-screw kneading extruder instead of the high shearing device and changing the barrel set temperature. However, when the twin-screw kneading extruder is used, the time required for reducing the molecular weight is longer than that of the high shearing device. Besides, when the molecular weight is reduced, the molecular weight is continuously reduced without passing through the passage to cool the polymer. Therefore, there is a problem that oxidation proceeds due to the molecular weight reduction and the low molecular weight polymer is thermally deteriorated.

Comparative Example 2

Raw Material

High molecular weight polymer: J108M

Device

Figure 15:
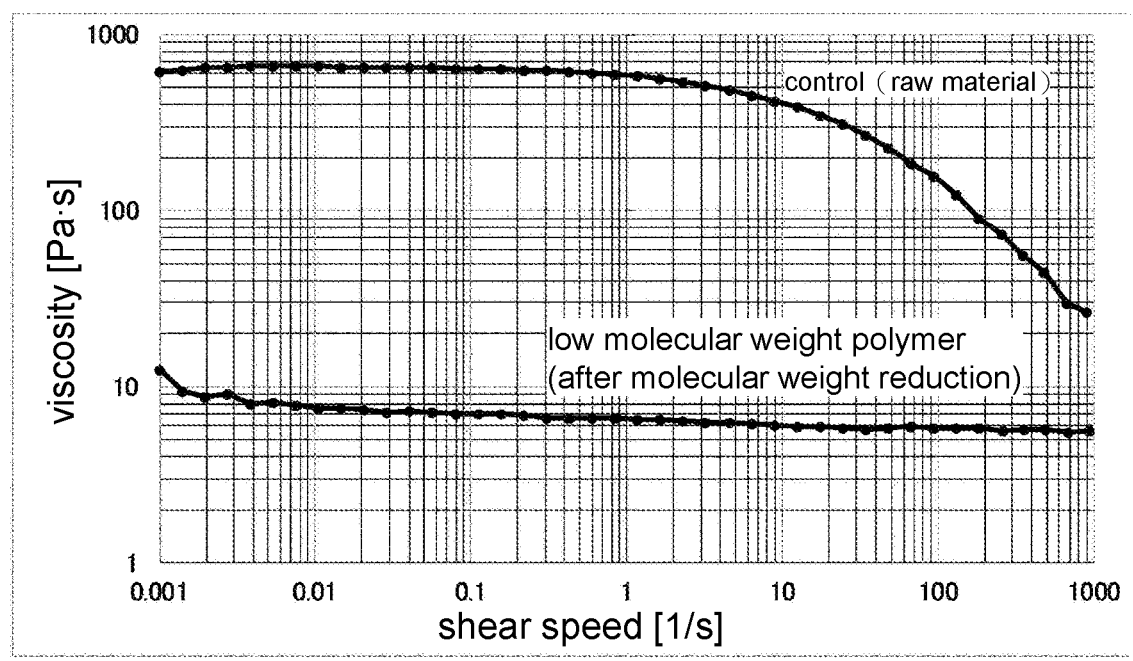
FIG. 15 is a graph showing the viscosity of a low molecular weight polymer obtained by molecular weight reduction of Comparative example 2.

Twin-screw kneading extruder (product name; TEM26 twin-screw kneading extruder, manufactured by Toshiba Machine Co., Ltd.)
  Barrel set temperature: 350° C.
  Raw material supply amount: 10 kg/h
  Screw rotation speed: 750 rpm FIG. 15 is a graph showing the viscosity of the low molecular weight polymer obtained by reducing the molecular weight using the twin-screw kneading extruder. As shown in the diagram, the high molecular weight polymer could also be reduced in molecular weight by using the twin-screw kneading extruder. However, as shown below, when the conventional twin-screw kneading extruder was used, the thermal deterioration in the molecular weight reduction was more serious than that in the low molecular weight polymer of the examples.

Measurement of Oxidation Degree of Low Molecular Weight Polymer (a) of FIG. 16 is a graph showing the measurement results of FT-IR regarding polypropylene used as the raw material, the low molecular weight polymer obtained at 3600 rpm in Example 4, and the low molecular weight polymer of Comparative example 2, and (b) of FIG. 16 is an enlarged graph showing the peak attributed to C—O expansion and contraction. Tables 7 and 8 show the results of evaluating the degree of thermal deterioration of the low molecular weight polymer by using the intensities of the peaks (1018.23, 1043.78, 997.50 $cm^{-1}$) derived from the C—O expansion and contraction, which indicate the degree of oxidation progress.

TABLE 7

| | Peak height | | |
|---|---|---|---|
| Wave number ($cm^{-1}$) | Control (raw material) | Example 4 | Comparative example 2 |
| 1018.23 | 0.00602 | 0.0118 | 0.04383 |
| 1043.78 | 0.00126 | 0.00598 | 0.0221 |
| 997.50 | 0.00924 | 0.0184 | 0.0260 |

TABLE 8

| | Ratio of peak height to control (raw material) | | |
|---|---|---|---|
| Wave number ($cm^{-1}$) | Control (raw material) | Example 4 | Comparative example 2 |
| 1018.23 | 1 | 1.96 | 7.28 |
| 1043.78 | 1 | 4.74 | 17.5 |
| 997.50 | 1 | 1.99 | 2.81 |

As shown in (a) and (b) of FIG. 16, Table 7 and Table 8, by the comparison of peaks derived from the C—O expansion and contraction of 900 to 1,300 $cm^{-1}$, it is found that C—O bonds have increased due to the molecular weight reduction. In the low molecular weight polymer of Comparative example 4, the increase in intensity of the peaks derived from the C—O expansion and contraction is remarkable. On the other hand, the intensity of the peaks derived from the C—O expansion and contraction of the low molecular weight polymer of Example 4 is slightly higher than that of the raw material, but is sufficiently smaller than that of the low molecular weight polymer of Comparative example 2. As described above, it is found that the low molecular weight polymer of Example 4 has a lower ratio of the peak height to the control (the high molecular weight polymer of the raw material) as compared with Comparative example 2, and the formation of C—O bonds due to thermal deterioration is suppressed.

As described above, it was found that the progress of oxidation in the molecular weight reduction can be suppressed by using the high shearing device. It is considered that the reason for this result is that the time required for reducing the molecular weight is short, and the temperature of the polymer can be maintained at a relatively low temperature by applying a shear force and passing the polymer through the passage to apply an intermittent shear force.

Moreover, the peak of FT-IR attributed to the expansion and contraction and the angle change of C—H increases in the same manner in Example 4 and Comparative example 2. Therefore, it is conceivable that the formation of a new C—H bond due to the breakage of the C—C bond occurs to the same extent. In addition, because the peak of 1,850 to 1,650 $cm^{-1}$ derived from C=O expansion and contraction is not observed, it is conceivable that no C=O bond is formed due to the molecular weight reduction.

Example 6

In this example, a low molecular weight polymer was produced using a high shearing device in which the number of damming points formed by the barrier portion 82 is increased. That is, the low molecular weight polymer was produced using a high shearing device including a screw body 37 having four barrier portions 82 equipped with passages 88 and a high shearing device including a screw body 37 having seven barrier portions 82 equipped with passages 88.

Raw Material

High molecular weight polymer: J108M

Device

High shearing device
  Passage: Circular cross section, diameter ϕ 2 mm (4 pieces)
  Barrel set temperature: 300° C.
  Rotation speed: 3600 rpm
  Raw material supply amount: 10 kg/h
  Number of dams: 4, 7

The low molecular weight polymer produced by the production method of the example had a low viscosity, and the melt flow rate (MFR) could not be measured directly. Therefore, the melt flow rate of the low molecular weight polymer was estimated based on a calibration curve created from data on the viscosity of polypropylene (zero shear viscosity) and the known value of the melt flow rate. The influence of the number of dams of the high shearing device on the zero shear viscosity and the melt flow rate of the low molecular weight polymer is shown in the table below.

TABLE 9

| Number of dams | Zero shear viscosity [Pa · s] | MFR [g/10 min] |
|---|---|---|
| 1* | — | 358 |
| 4 | 14.41 | 1073 |
| 7 | 9.73 | 1494 |

From the results of this example, it was found that a low molecular weight polymer having a low zero shear viscosity can be produced by increasing the number of damming points of the high shearing device. It is estimated that this is because the polymer was dammed inside the screw to create a filled state, and thereby the increase in the unfilled part due to the increase in the rotational speed could be suppressed and a large shear stress could be applied to the polymer.

In addition, it was found that the molecular weight reduction with a melt flow rate of 500 [g/10 min] or more and further with a melt flow rate exceeding 1000 [g/10 min], which is required for the production of a melt-blown non-woven fabric, can be made by molecular weight reduction of a high molecular weight polymer using a high shearing device and using a general-purpose polymer as the raw material.

Example 7

In the example, the influence of the extrusion amount was investigated using the following raw material and device.

Raw Materials

High molecular weight polymer: J108M

Device

High shearing device
  Passage: Circular cross section, diameter φ 2 mm (4 pieces)
  Barrel set temperature: 300° C.
  Rotation speed: 3600 rpm
  Raw material supply amount: 10 kg/h, 50 kg/h, 100 kg/h
  Number of dams: 4

Because the low molecular weight polymer of the example had a low viscosity, the melt flow rate was estimated based on the calibration curve as in Example 6. The influence of the extrusion amount of the high shearing device on the zero shear viscosity and the melt flow rate is shown in the table below.

TABLE 10

| Extrusion amount [kg/h] | Zero shear viscosity [Pa · s] | MFR [g/10 min] |
|---|---|---|
| 10 | 14.41 | 1073 |
| 50 | 14.05 | 1096 |
| 100 | 14.47 | 1069 |

From the results of the example, different from the influence of the number of damming points in the high shearing device, the zero shear viscosity and the melt flow rate of the obtained low molecular weight polymer did not change substantially by increasing the extrusion amount.

Example 8

J108M (trade name, manufactured by Prime Polymer Co., Ltd., Mw 251,000) which is a general-purpose polypropylene was reduced in molecular weight using the high shearing device to produce a low molecular weight polymer having a MFR of 1148. A melt-blown non-woven fabric was produced using this low molecular weight polymer. The physical property targets of the melt-blown non-woven fabric were set to a basis weight of 10 to 40 g/m² and an average fiber diameter of 2 μm or less.
High shearing device
  Screw diameter (outer diameter) of barrel unit: 48 mm
  Effective screw length (L/D) of barrel unit: 18.75
  Passage: Circular cross section, diameter φ 2 mm (4 pieces)
  Passage length (L2, see FIG. 9): 45 mm
  Number of dams (number of barrier portions): 4

Conditions

Raw material supply amount: 20 kg/h
  Barrel set temperature: 320° C.
  Screw rotation speed: 3600 rotations/minute (a) of FIG. 19 is a drawing-substituting photograph showing the appearance of a melt-blown non-woven fabric produced from a low molecular weight polymer obtained by reducing the molecular weight of J107G with a high shearing device, and (b) of FIG. 19 is an electron microscope image. The color of the melt-blown non-woven fabric was good, and the influence of oxidation due to the molecular weight reduction was small. In addition, the feeling of touching the melt-blown non-woven fabric was not rough and had a supple texture, and thus it is conceivable that no resin pool was generated. The fibers were dense and no gaps were found. No problem such as uneven discharge or fiber scattering occurred during melt-blown formation. When the electron microscope image shown in (b) of FIG. 19 was observed, no large variation in fiber diameter was confirmed. The physical properties of the produced melt-blown non-woven fabric were a basis weight of 30 g/m² and an average fiber diameter of 1.6 μm.

Example 9

In Example 8, it was confirmed that a melt-blown non-woven fabric can be produced using, as the raw material, a low molecular weight polymer obtained by molecular weight reduction at a raw material supply amount of 20 kg/h. However, in the production of the melt-blown non-woven fabric, a melt-blown device corresponding to the raw material supply at about 2 kg/h may be used. Therefore, in the example, when the raw material supply was 2 kg/h, various low molecular weight polymers were produced by adjusting the conditions of the high shearing device.

It was confirmed that low molecular weight polymers of MFR500 to 2000 [g/10 min] suitable for producing a melt-blown non-woven fabric can be produced.

Raw Material

High molecular weight polymer
  J107G (trade name, manufactured by Prime Polymer Co., Ltd., Mw 280,000, low viscosity polypropylene, MFR30 [g/10 min])
High shearing device
  Screw diameter (outer diameter) of barrel unit: 48 mm
  Effective screw length (L/D) of barrel unit: 12.5
  Passage: Circular cross section, diameter φ 2 mm (1 piece)
  Passage length (L2, see FIG. 9): 45 mm
  Number of dams (number of barrier portions): 4

Conditions

Raw material supply amount: 2 kg/h
  Barrel set temperature: 260 to 320° C.
  Screw rotation speed: 3000 to 5000 rotations/minute As shown in Table 11, by adjusting the conditions (the rotation speed and the barrel set temperature) of the high shearing device, low molecular weight polymers of MFR500 to 2000 [g/10 min] suitable for producing a melt-blown non-woven fabric could be produced.

TABLE 11

| Rotational speed (rotation/minute) | Barrel temperature (° C.) | Zero shear viscosity [Pa · s] | MFR (estimated value) [g/10 min] |
| --- | --- | --- | --- |
| 5000 | 320 | 0.940 | 10687 |
| 5000 | 300 | 2.031 | 5589 |
| 3600 | 320 | 2.210 | 5203 |
| 3600 | 300 | 4.037 | 3130 |
| 3600 | 280 | 6.434 | 2117 |
| 3600 | 260 | 9.230 | 1561 |
| 3000 | 280 | 9.642 | 1505 |
| 3000 | 260 | 14.54 | 1067 |

INDUSTRIAL APPLICABILITY

The present invention can reduce the molecular weight of a high molecular weight polymer without adding a peroxide to produce a low molecular weight polymer, and can be used, for example, for producing a low molecular weight polymer suitable for a melt-blown production method.

What is claimed is:

1. A production method for low molecular weight polymer using a continuous high shearing device, wherein
a shear force is applied to a high molecular weight polymer serving as a raw material by rotation of a screw body to reduce a molecular weight so as to obtain a low molecular weight polymer,
the low molecular weight polymer is cooled by passing through a passage arranged in an axial direction inside the screw body,
the high molecular weight polymer has a weight average molecular weight of 200,000 or more,
the low molecular weight polymer has a weight average molecular weight of less than 200,000, and
the high molecular weight polymer does not contain a molecular weight reducing agent.

2. The production method for low molecular weight polymer according to claim 1, wherein the polydispersity of the low molecular weight polymer is 2 to 5.

3. The production method for low molecular weight polymer according to claim 1, wherein
the high molecular weight polymer is polypropylene having a weight average molecular weight of 250,000 to 1,100,000, and
the low molecular weight polymer has a melt flow rate of 500 g/10 min to 2,000 g/10 min.

4. The production method for low molecular weight polymer according to claim 1, wherein a rotation speed of the screw body is 2000 to 6000 rpm.

5. The production method for low molecular weight polymer according to claim 1, wherein the cross section of the passage is circular, and a diameter of the cross section is 1/16 to 1/32 of an outer diameter of the screw body.

6. The production method for low molecular weight polymer according to claim 5, wherein a plurality of passages are arranged in parallel inside the screw body.

7. The production method for low molecular weight polymer according to claim 5, wherein four passages are evenly arranged in parallel inside the screw body.

8. A production method for melt-blown non-woven fabric, wherein
a shear force is applied to a high molecular weight polymer that does not contain a molecular weight reducing agent to obtain a low molecular weight polymer that has been reduced in molecular weight,
hot air is supplied to the low molecular weight polymer extruded from a die and the low molecular weight polymer is stretched in a fibrous form to obtain a non-woven fabric,
the high molecular weight polymer has a weight average molecular weight of 200,000 or more, and
the low molecular weight polymer has a weight average molecular weight of less than 200,000.

9. The production method for low molecular weight polymer according to claim 1, wherein
the screw body is included in a single-screw extruder, wherein the single-screw extruder comprises a barrel and a screw, and the screw comprises the screw body,
the screw body comprises a transport portion and a barrier portion,
the transport portion transports the raw material,
the transport portion has a first flight that is spirally twisted, the barrier portion has a second flight that is spirally twisted, a twist pitch of the second flight is set to be smaller than a twist pitch of the first flight, and
wherein in the production method for low molecular weight polymer using a continuous high shearing device,
forming a raw material reservoir with 100% filling rate of the high molecular weight polymer immediately before the barrier portion, and
applying the shear force by a gap between an inner peripheral surface of a cylinder portion in the barrel and a top portion of the first flight, and reducing the molecular weight of the high molecular weight polymer, wherein
the passage is formed across the barrier portion.

* * * * *